US006528148B2

(12) United States Patent
Niu et al.

(10) Patent No.: US 6,528,148 B2
(45) Date of Patent: Mar. 4, 2003

(54) PRINT MEDIA PRODUCTS FOR GENERATING HIGH QUALITY VISUAL IMAGES AND METHODS FOR PRODUCING THE SAME

(75) Inventors: Bor-Jiunn Niu, San Diego, CA (US); Yubai Bi, San Diego, CA (US)

(73) Assignee: Hewlett-Packard Company, Fort Collins, CO (US)

( * ) Notice: Subject to any disclaimer, the term of this patent is extended or adjusted under 35 U.S.C. 154(b) by 69 days.

(21) Appl. No.: 09/778,248

(22) Filed: Feb. 6, 2001

(65) Prior Publication Data

US 2002/0148577 A1 Oct. 17, 2002

(51) Int. Cl.[7] .......................... B32B 27/14; B32B 3/00

(52) U.S. Cl. ...................... 428/195; 428/327; 428/323; 428/207; 428/211; 428/535; 428/500; 162/135; 162/136; 162/138; 162/164.1

(58) Field of Search ............................... 162/135, 136, 162/138, 164.1; 428/327, 323, 207, 211, 328, 329, 212, 195, 304.4, 141, 330, 331, 341, 342, 409, 520, 522, 428, 535, 537.5, 500, 511, 423.1

(56) References Cited

U.S. PATENT DOCUMENTS

| | | | |
|---|---|---|---|
| 4,329,698 | A | 5/1982 | Smith |
| 4,391,850 | A | 7/1983 | Shanton |
| 440,827 | A | 4/1984 | Miyamoto et al. |
| 4,446,174 | A | 5/1984 | Maekawa et al. |
| 4,474,847 | A | 10/1984 | Schröder et al. |
| 4,567,096 | A | 1/1986 | Piltingsrud et al. |
| 4,623,557 | A | 11/1986 | Yamori et al. |
| 4,642,247 | A | 2/1987 | Mouri et al. |
| 4,707,406 | A | 11/1987 | Inaba et al. |
| 4,749,291 | A | 6/1988 | Kobayashi et al. |
| 4,771,295 | A | 9/1988 | Baker et al. |
| 4,780,356 | A | 10/1988 | Otouma et al. |
| 4,785,313 | A | 11/1988 | Higuma et al. |
| 4,879,166 | A | 11/1989 | Misuda et al. |
| 4,892,787 | A | 1/1990 | Kruse et al. |
| 4,963,189 | A | 10/1990 | Hindagolla |
| 5,008,231 | A | 4/1991 | Yoshizawa et al. |
| 5,013,603 | A | 5/1991 | Ogawa et al. |
| 5,075,153 | A | 12/1991 | Malhotra |
| 5,091,359 | A | 2/1992 | Ishida et al. |
| 5,093,159 | A | 3/1992 | Fernandez et al. |
| 5,104,730 | A | 4/1992 | Misuda et al. |
| 5,185,034 | A | 2/1993 | Webb et al. |
| 5,194,347 | A | 3/1993 | Vermeulen et al. |
| 5,264,275 | A | 11/1993 | Misuda et al. |
| 5,266,383 | A | 11/1993 | Sakaki et al. |
| 5,278,584 | A | 1/1994 | Keefe et al. |
| 5,354,634 | A | 10/1994 | Misuda et al. |
| 5,397,619 | A | 3/1995 | Kuroyama et al. |
| 5,397,674 | A | 3/1995 | Ozaki et al. |
| 5,428,383 | A | 6/1995 | Shields et al. |
| 5,463,178 | A | 10/1995 | Suzuki et al. |
| 5,472,773 | A | 12/1995 | Misuda et al. |
| 5,514,636 | A | 5/1996 | Takeuchi |
| 5,515,093 | A | 5/1996 | Haruta et al. |
| 5,576,088 | A | 11/1996 | Ogawa et al. |
| 5,605,750 | A | 2/1997 | Romano et al. |
| 5,609,964 | A | 3/1997 | Ogawa et al. |
| 5,635,297 | A | 6/1997 | Ogawa et al. |
| 5,665,504 | A | 9/1997 | Malhotra |
| 5,691,046 | A | 11/1997 | Matsubara et al. |
| 5,723,211 | A | 3/1998 | Romano et al. |
| 5,728,427 | A | 3/1998 | Akkerman et al. |
| 5,744,273 | A | 4/1998 | Malhotra |
| 5,753,588 | A | 5/1998 | Iida et al. |
| 5,755,929 | A | 5/1998 | Kuroyama et al. |
| 5,759,727 | A | 6/1998 | Malhotra |
| 5,798,397 | A | 8/1998 | Noguchi et al. |
| 5,804,293 | A | 9/1998 | Nehmsmann et al. |
| 5,837,649 | A | 11/1998 | Nozaki |
| 5,846,637 | A | 12/1998 | Malhotra et al. |
| 5,863,648 | A | 1/1999 | Ohmura et al. |
| 5,882,388 | A | 3/1999 | Adair et al. |
| 5,888,367 | A | 3/1999 | Mouri et al. |
| 5,897,961 | A | 4/1999 | Malhotra et al. |
| 5,912,071 | A | 6/1999 | Takeshita et al. |
| 5,916,673 | A | 6/1999 | Fryberg et al. |
| 5,919,552 | A | 7/1999 | Malhotra |
| 5,928,789 | A | 7/1999 | Chen et al. |
| 5,962,124 | A | 10/1999 | Yoshino et al. |
| 5,965,244 | A | 10/1999 | Tang et al. |
| 5,975,686 | A | 11/1999 | Hauck et al. |
| 5,977,019 | A | 11/1999 | Ozeki et al. |
| 5,985,076 | A | 11/1999 | Misuda et al. |
| 6,040,060 | A | 3/2000 | Missel et al. |
| 6,063,489 | A | 5/2000 | Kobayashi et al. |
| 6,086,738 | A | 7/2000 | Mouri et al. |
| 6,089,704 | A | 7/2000 | Burns et al. |
| 6,197,880 | B1 | 3/2001 | Nigam |
| 6,214,449 | B1 | 4/2001 | Otani et al. |

FOREIGN PATENT DOCUMENTS

| | | |
|---|---|---|
| JP | 10-181189 | 7/1998 |

*Primary Examiner*—Steven P. Griffin
*Assistant Examiner*—Marli Halpern

(57) ABSTRACT

Ink-receiving print media products having multiple capabilities including (A) minimal drying time; (B) improved smear-fastness; (C) the ability to generate high-definition images with desirable gloss characteristics and gloss-uniformity; and (D) excellent compatibility between the ink materials being delivered and the media products along with other related benefits including the control of ink-coalescence. The print media products of interest have at least one ink-receiving layer on a substrate (e.g. polyethylene-coated paper), with the ink-receiving layer including a poly(vinyl alcohol-ethylene oxide) copolymer as a special multi-functional ingredient designed to produce the foregoing benefits. The copolymer may be employed alone or combined with one or more other ingredients in the ink-receiving layer including pigment(s), supplemental binder(s), and the like in order to fabricate an effective media product ideally suited for inkjet image generation using a wide variety of inks.

13 Claims, 2 Drawing Sheets

PRINT MEDIA PRODUCTS FOR GENERATING HIGH QUALITY VISUAL IMAGES AND METHODS FOR PRODUCING THE SAME

BACKGROUND OF THE INVENTION

The present invention generally relates to media products for receiving printed images thereon. More particularly, the invention described herein involves image-receiving sheet materials each having at least one ink-receiving layer with a specialized and distinctive chemical composition therein that is used to provide a number of important benefits in a simultaneous fashion. These benefits include but are not limited to a high degree of compatibility between the ink materials being delivered and the ink-receiving layer under consideration, rapid drying times, the generation of smear-fast printed images, the control of ink-coalescence (defined below), the attainment of uniform gloss levels (and a high level of gloss if desired), as well as numerous other benefits relating to image quality.

Substantial developments have been made in the field of electronic printing technology. A wide variety of highly-efficient printing systems currently exist which are capable of dispensing ink in a rapid and accurate manner. Thermal inkjet systems are especially important in this regard. Printing units using thermal inkjet technology basically involve an apparatus which includes at least one ink reservoir chamber in fluid communication with a substrate (preferably made of silicon [Si] and/or other comparable materials) having a plurality of thin-film heating resistors thereon. The substrate and resistors are maintained within a structure that is conventionally characterized as a "printhead". Selective activation of the resistors causes thermal excitation of the ink materials stored inside the reservoir chamber and expulsion thereof from the printhead. Representative thermal inkjet systems are discussed in, for example, U.S. Pat. No. 4,771,295 to Baker et al. and U.S. Pat. No. 5,278,584 to Keefe et al. which are both incorporated herein by reference.

The ink delivery systems described above (and comparable printing units using thermal inkjet technology) typically include an ink containment unit (e.g. a housing, vessel, or tank) having a self-contained supply of ink therein in order to form an ink cartridge. In a standard ink cartridge, the ink containment unit is directly attached to the remaining components of the cartridge to produce an integral and unitary structure wherein the ink supply is considered to be "on-board" as shown in, for example, U.S. Pat. No. 4,771,295 to Baker et al. However, in other cases, the ink containment unit will be provided at a remote location within the printer, with the ink containment unit being operatively connected to and in fluid communication with the printhead using one or more ink transfer conduits. These particular systems are conventionally known as "off-axis" printing units. A representative, non-limiting off-axis ink delivery system is discussed in, for example, U.S. Pat. No. 5,975,686 to Hauck et al. which is also incorporated herein by reference. The present invention as described below (which involves a plurality of novel ink-receiving print media products) is applicable to both on-board and off-axis systems (as well as any other types which include at least one ink containment vessel that is either directly or remotely in fluid communication with a printhead containing one or more ink-ejecting resistors therein). Furthermore, while the print media materials outlined herein will be discussed with primary reference to thermal inkjet technology, it shall be understood that they may be employed in connection with other ink delivery systems and methods including but not limited to piezoelectric drop devices of the variety disclosed in U.S. Pat. No. 4,329,698 to Smith and dot matrix units of the type described in U.S. Pat. No. 4,749,291 to Kobayashi et al., as well as other comparable and diverse systems designed to deliver ink using one or more ink delivery components/assemblies. In this regard, the claimed print media products and methods shall not be considered "print method-specific".

In order to effectively generate printed images using the various ink transfer techniques and systems discussed herein (again, with primary but not exclusive reference to thermal inkjet technology), ink-receiving print media materials must be employed which are capable of efficiently accomplishing this goal. Ideally, to achieve maximum efficiency, print media materials should be able to provide numerous advantages and benefits including but not limited to (1) a high level of light-fastness, with the term "light-fastness" being generally defined herein to involve the capacity of a print media product to retain images thereon in a stable fashion without substantial fading, blurring, distortion, and the like over time in the presence of natural or made-made light; (2) rapid drying times in order to avoid smudging and image deterioration immediately after printing is completed due to contact with physical objects and the like; (3) the fast and complete absorption of ink materials in a manner which avoids image distortion caused by color bleed (e.g. the undesired migration of multi-colored ink components into each other) and related difficulties; (4) a highly water-fast character (with the term "water-fast" being generally defined to involve the ability of a print media product to produce a stable image with little or no fading, run-off, distortion, and the like when the image is placed in contact with moisture); (5) the generation of "crisp" images with a distinct and defined character; (6) the ability to produce printed products which are substantially "smear-fast", with this term being generally defined to comprise the production of images that will not exhibit smearing, blurring, and the like when rubbed or otherwise physically engaged with a variety of objects ranging from the components of the printing apparatus being employed to the print operator's hands, fingers, and the like; (7) the control of an undesired condition known as "ink-coalescence" which is defined herein to involve a phenomenon wherein wet ink droplets applied to an inkjet printing medium fail to spread sufficiently to eliminate the unprinted space between the droplets, thereby causing significant image deterioration problems; (8) the capacity to generate printed images with desired levels of gloss wherein the final product is characterized by uniform gloss levels throughout the entire image in order to achieve a professional and aesthetically-pleasing printed media sheet; (9) low material costs which enable the print media products of interest to be employed for mass market home and business use; (10) chemical compatibility with a wide variety of ink formulations which leads to greater overall versatility; (11) excellent levels of image stability and retention over long time periods; (12) minimal complexity from a production and material-content standpoint which leads to reduced fabrication costs and greater product reliability; and (13) a high level of gloss-control which is achievable in a rapid and effective manner during production through only minor adjustments in the manufacturing process. The term "gloss-control" is generally defined herein to involve the ability, during fabrication, to generate a print media product having high-gloss levels for the production of photographic quality images if desired, a semi-gloss character if needed, or other gloss parameters. In particular, the manufacturing process should be highly controllable in order to achieve a variety of different gloss characteristics without requiring major adjustments in processing steps and materials.

In the past, many different print media sheets using a wide variety of ingredients, production techniques, layering arrangements, and the like have been fabricated for a multitude of specific purposes. For example, as generally discussed in the representative patent documents listed below, the following items have been investigated and/or employed in the production of print media products to achieve a broad spectrum of goals: modifications in the types of materials being used, the amounts of such materials, the relative particle sizes thereof, the particular layering arrangements being chosen, and the adjustment of various factors including pore size, pore volume, layer thickness, particle orientation, surface roughness, surface rigidity, air permeability, and other similar parameters. Representative patents (incorporated herein by reference) which discuss at least one or more of the above-listed factors (and others) are as follows: U.S. Pat. Nos. 4,391,850; 4,440,827; 4,446,174; 4,474,847; 4,567,096; 4,623,557; 4,642,247; 4,780,356; 4,785,313; 4,879,166; 5,008,231; 5,013,603; 5,091,359; 5,104,730; 5,194,347; 5,266,383; 5,354,634; 5,397,619; 5,463,178; 5,472,773; 5,514,636; 5,576,088; 5,605,750; 5,609,964; 5,635,297; 5,691,046; 5,723,211; 5,753,588; 5,755,929; 5,804,293; 5,863,648; 5,882,388; 5,912,071; 5,928,789; 5,962,124; 5,965,244; 5,977,019; 5,985,076; and 6,063,489.

Notwithstanding the various media products discussed in the above-listed patents and prior activities in this field, a need remains for print media materials (namely, ink-receiving sheets) which are able to capture and retain clear, distinct, and accurate images thereon that are likewise characterized by a number of specific benefits in combination. These benefits include but are not limited to items [1]–[13] recited above both on an individual and simultaneous basis in a substantially automatic manner (with the simultaneous achievement of such goals being of particular importance and novelty). The attainment of these objectives is especially important regarding the following specific items: gloss-control (with high gloss levels and gloss-uniformity being of primary interest in a preferred embodiment), excellent light-fastness, rapid drying time, an effective level of ink-coalescence control, and the generation of clear, durable, smear-fast, and distinct printed images. The present invention and its various embodiments perform all of the functions recited above in a uniquely effective and simultaneous manner while using a minimal number of material layers, chemical compositions, and production steps. In particular (as will become readily apparent from the discussion provided herein), the foregoing advantages and attributes are achieved through the employment of at least one ink-receiving layer having a very special ingredient therein, the use of which in a print media product is entirely novel and offers the above-listed benefits. As a result, print media structures of minimal complexity are created that nonetheless exhibit a substantial number of beneficial characteristics and features in an unexpectedly efficient fashion. In this regard, the present invention represents a distinctive and important advance in the print media and image generation fields. Specific information concerning the novel print media materials of the invention and specialized fabrication methods associated therewith (which are equally unique) will be presented below in the following Summary of the Invention, Brief Description of the Drawings, and Detailed Description of Preferred Embodiments Sections.

SUMMARY OF THE INVENTION

It is an object of the present invention to provide highly efficient print media products for receiving inks, pigments, toners, and other colorants thereon so that a printed image may be generated.

It is another object of the invention to provide highly efficient print media products which enable the generation of stable printed images thereon from a variety of different coloring agents in many divergent forms.

It is another object of the invention to provide highly efficient print media products which facilitate the generation of printed images that are light-fast and water-fast as defined above.

It is another object of the invention to provide highly efficient print media products wherein the printed images produced thereon may be generated using a wide variety of printing technologies including but not limited to those which employ thermal inkjet technology.

It is another object of the invention to provide highly efficient print media products which are able to retain printed images thereon that exhibit an excellent degree of stability (including the avoidance of color bleed, namely, the undesired blending of colorants into each other) over prolonged time periods and under conditions of varying temperature, humidity, and the like.

It is another object of the invention to provide highly efficient print media products wherein the printed images produced thereon are characterized by rapid drying times.

It is another object of the invention to provide highly efficient print media products wherein the printed images thereon are substantially smear-fast when placed in contact with physical objects under a wide variety of environmental conditions.

It is another object of the invention to provide highly efficient print media products which avoid problems associated with ink-coalescence so that clear and distinct printed images can be generated.

It is another object of the invention to provide highly efficient print media products which have the capacity to generate printed images with desired levels of gloss (preferably high) wherein the final printed image is characterized by uniform gloss levels throughout the entire image plane in order to achieve a professional and aesthetically-pleasing printed media sheet.

It is another object of the invention to provide highly efficient print media products wherein the overall level of gloss is readily controlled without major adjustments to the production process, with such process allowing the fabrication of high-gloss or semi-gloss products in an effective and economical manner.

It is another object of the invention to provide highly efficient print media products which are able to effectively accomplish all of the above-listed goals and others (including the generation of images that are substantially water-fast and highly-defined) in a simultaneous fashion, with this aspect of the invention being accomplished in accordance with the unique layering arrangements and chosen construction materials discussed herein.

It is a further object of the invention to provide highly efficient print media products which are able to effectively accomplish all of the above-listed goals using a minimal number of material layers and construction materials.

It is an even further object of the invention to provide highly efficient print media products which employ layering arrangements and construction materials that are readily suited to large scale mass-production fabrication processes in an economical fashion.

It is an even further object of the invention to provide highly efficient print media products that are readily used in a wide variety of different printing systems with differing colorants (e.g. inks, pigments, toners, and the like) for many diverse purposes.

It is a still further object of the invention to provide highly efficient, rapid, and economical manufacturing methods which may be employed to produce the print media products of the present invention as discussed herein.

Novel and effective print media products (also characterized herein as "print media sheets", "ink-receiving sheets", and the like) are described below which offer numerous advantages and benefits over prior structures. These benefits and advantages include, without limitation, the simultaneous achievement of items [1]–[13] recited above with particular reference to (A) gloss-control (wherein high gloss levels and gloss-uniformity are of primary interest in a preferred embodiment); (B) excellent light-fastness; (C) rapid drying time; (D) a high degree of ink-coalescence control; and (E) the generation of clear, durable, smear-fast, and distinct printed images. In this regard, the claimed invention represents a significant advance in the print media technology and image generation fields.

As a preliminary point of information, the present invention shall not be restricted to any particular component types, sizes, material-selections, arrangements of print media materials, chemical compositions, layering sequences, numbers of layers, layer orientations, thickness values, porosity parameters, and other related factors unless otherwise stated herein. For example, it shall be understood that one or a plurality of novel ink-receiving layers containing the desired and special ingredient discussed herein may be employed in connection with the claimed media sheets. In this regard, the current invention shall not be restricted to any number of layers containing the chosen ingredient formulations provided that at least one of such layers is used. Likewise, the location of the ink-receiving layer(s) on or within the media sheet may be varied as desired and employed in combination with one or more other material layers located above or below the claimed layer(s) of interest. It shall therefore be emphasized that this invention shall cover the ink-receiving layer or layers of interest (e.g. those that employ the special ingredient specified herein) regardless of where such layer(s) are located provided that they are able to receive on or within at least part of the ink compositions being delivered by the chosen printing system. Accordingly, this invention shall be construed in its broadest sense to cover a print media product (and method for producing the same) which employs at least one ink-receiving layer having the chosen special ingredient therein [namely, a poly(vinyl alcohol-ethylene oxide) copolymer] so that this layer can receive at least part of the ink materials being delivered. In this manner, a printed image can be generated having the desired characteristics listed above.

Furthermore, the numerical values recited in this section and the other sections set forth below constitute preferred embodiments designed to provide optimum results and shall not limit the invention in any respect. In particular, it shall be understood that the specific embodiments discussed herein and illustrated in FIGS. 1–4 (along with the particular construction materials associated therewith) constitute special versions of the invention which, while non-limiting in nature, can offer excellent results and are highly distinctive. All recitations of chemical formulae and structures set forth in the following discussion are intended to generally indicate the types of materials which may be used in this invention. The listing of specific chemical compositions which fall within the general formulae and classifications presented below are offered for example purposes only and shall be considered non-limiting unless explicitly stated otherwise.

The claimed invention and its novel developments are applicable to a wide variety of printing systems with particular reference to those that employ thermal inkjet technology as previously discussed. Likewise, a number of different ink materials can be used in connection with the invention without limitation, with the term "ink materials" being defined to encompass compositions incorporating dyes, pigments, liquid or solid toners, and other colorants without restriction. Furthermore, such materials (e.g. colorants) shall encompass both chromatic (e.g. colored) and achromatic materials (black/white) without restriction. In this regard, the claimed print media products shall not be considered "ink-specific" or "printing method-specific" in any fashion.

It should also be understood that the present invention shall not be limited to any particular construction techniques (including any given material deposition procedures, layering arrangements, and the like) unless otherwise stated below. For example, the terms "forming", "applying", "delivering", "placing", "positioning", "operatively attaching", "operatively connecting", "converting", "providing", "layering", and the like as used throughout this discussion and as claimed shall broadly encompass any appropriate manufacturing procedures including, without limitation, roll-coating, spray-coating, immersion-coating, cast-coating, slot-die coating, curtain coating, rod-coating, blade-coating, roller application, and other related production methods. In this regard, the invention shall not be considered "production method-specific" unless otherwise stated herein, with the recitation of any particular fabrication techniques, layer deposition methods, number of layers applied in a given step, and the like being set forth for example purposes only.

Likewise, it shall be understood that the terms "operative connection", "operative attachment", "in operative connection", "in operative attachment", "operatively attached", "positioned on", "located on", "positioned above", "layered on", "positioned over and above", "located over and above", "applied over and above", and the like as used and claimed herein shall be broadly construed to encompass a variety of divergent layering arrangements and assembly techniques. These arrangements and techniques include but are not limited to (1) the direct attachment of one material layer to another material layer with no intervening material layers therebetween; and (2) the attachment of one material layer to another material layer with one or more material layers therebetween provided that the one layer being "attached to", "connected to", or "positioned over and above" the other layer is somehow "supported" by the other layer (notwithstanding the presence of one or more additional material layers therebetween). Use of the phrase "direct attachment", "directly attached on", "directly attached to", "directly positioned on", "directly located on", and the like shall signify a situation wherein a given material layer is secured to another material layer without any intervening material layers therebetween. Any statement used herein which indicates that one layer of material is "above", "over", "positioned over and above", or "on top of" another layer shall involve a situation wherein the particular layer that is "above", "over", "positioned over and above" or "on top of" of the other layer in question shall be the outermost of the two layers relative to the external environment. The opposite situation will be applicable regarding use of the terms "below", "under", "beneath", "on the bottom of", and the like. The characterizations recited above (with particular reference to "positioned over and above") shall be effective regardless of the orientation of the print media materials under consideration and, for example, shall encompass a situation where the ink-receiving layer may be placed on either side of the substrate in question. Again, in the current invention, the claimed ink-receiving layer or layers may be located at any position within the print media sheet provided that at least some of the ink materials being delivered by the chosen printing system are able to come in contact with such layer or layers, followed by the receipt of ink materials therein and/or thereon. Thus, while the drawing figures associated with this invention (and the preferred embodiments discussed below) shall illustrate the claimed ink-receiving layer(s) on top of the media sheet as the uppermost/outermost structures which are exposed to the external environment with no other layers thereon, the claimed invention shall not be restricted to this design which is offered for example purposes only. As a final note, the terms "top", "uppermost", and "outermost" as applied to a given layer in the claimed structure shall again be construed to involve that layer which is at the top of the print media product in question with no other layers thereon and is exposed to the external environment. When such layer faces the ink delivery components of the printer unit, it is typically the first component of the media product to receive incoming ink materials with no other layers thereon.

Furthermore, any and all recitations of structures, layers, materials, and components in the singular throughout the claims, Summary of the Invention, and Detailed Description of Preferred Embodiments sections shall also be construed to encompass a plurality of such items unless otherwise specifically noted herein.

As previously indicated, highly effective and versatile print media materials designed to receive ink materials thereon for the generation of clear, stable, and distinct printed images are provided. These media materials are again characterized by excellent gloss levels, a high degree of gloss-uniformity, and a desirable degree of ink-coalescence control as defined above. Many different ink delivery systems can be employed to generate the printed images of interest on the claimed media products without limitation although the use of devices that incorporate thermal inkjet technology are again preferred. Regardless of which ink delivery system is chosen, the present invention is capable of offering the considerable benefits listed above which include more efficient, rapid, and reliable image generation.

The following discussion shall constitute a brief and general overview of the invention which shall not limit the invention in any respect. More specific details concerning particular embodiments and other important features of the invention will again be recited in the Detailed Description of Preferred Embodiments section set forth below. All scientific terms used throughout this discussion shall be construed in accordance with the traditional meanings attributed thereto by individuals skilled in the art to which this invention pertains unless a special definition is provided herein.

As previously stated, the claimed invention involves one or more novel print media products (discussed in connection with a plurality of preferred embodiments) which are characterized by improved functional abilities, namely, more efficient image generation (e.g. excellent gloss-control/gloss-uniformity, rapid drying, image clarity, the ability to control ink coalescence, light-fastness, water-fastness, smear-fastness, color-bleed avoidance, and the like which are all achieved in a simultaneous and automatic fashion). The components and novel features associated with the claimed print media products will now be briefly summarized.

In order to produce a preferred print media product in accordance with the invention, a support structure, "support", or "substrate" (with all of such terms being considered equivalent from a structural and functional standpoint) is initially provided on which the other layer or layers associated with the print media product reside. Many different construction materials can be employed in connection with the substrate including those which are made from paper, plastics, metals, or composites of such materials without limitation although paper (any commercially-available type) is preferred. More detailed data regarding substrate construction materials will be presented below. The chosen substrate may be coated or uncoated on either or both sides thereof. In a preferred embodiment designed to provide optimum results, the substrate will include an upper surface (also characterized herein as a "first side") and a lower surface (also characterized herein as a "second side"), with at least one of such surfaces/sides (preferably the upper surface or both surfaces) being covered with a substantially non-porous, non-absorbent, and ink-impermeable composition in the form of a coating layer. A representative and exemplary coating composition associated with this embodiment involves polyethylene when a paper substrate is employed. However, other coating/substrate combinations can be used without limitation, or the application of substrate coatings can be eliminated entirely if desired as determined by routine preliminary pilot testing.

Positioned (e.g. provided) over and above the substrate (and secured thereto with "direct attachment" being preferred but not necessarily required) is at least one "ink-receiving layer". From a functional standpoint, the ink-receiving layer is designed to provide a high degree of "capacity" (e.g. ink-retention capability) in connection with the media product, to facilitate rapid drying of the printed, image-containing media product, to create a media product with a smooth/even surface, to ensure that the desired gloss characteristics are maintained in the finished product, and to generate a stable printed image with desirable degrees of ink-coalescence control and the like. To accomplish these goals, the ink-receiving layer is comprised of a special material which has numerous functions including but not limited to binding capabilities, ink-absorptivity, the capacity to affix and retain printed images in a highly stable manner, and the like. This special material involves at least one poly(vinyl alcohol-ethylene oxide) copolymer. The term "copolymer" basically and generally relates to a polymer which contains two or more different monomers. The poly(vinyl alcohol-ethylene oxide) copolymer to be employed in the claimed ink-receiving layer has the following basic chemical/polymeric structure:

$$-(CH_2CHOH)_x-(OCH_2CH_2)_y-$$

[wherein x=about 1000–8000, and y=about 10–500]

It should be noted and understood that the above-listed "x" and "y" values are presented for example purposes only and constitute representative/preferred embodiments in a non-limiting fashion Such numbers may be subject to change if needed and desired in accordance with routine preliminary testing. Further and more detailed information concerning the above-listed composition (and at least one or more commercial sources for this material) will be provided below in the Detailed Description of Preferred Embodiments section.

If a substrate is employed which is coated (e.g. polyethylene-coated paper in a preferred embodiment), the ink-receiving layer(s) of this invention which incorporate at least one poly(vinyl alcohol-ethylene oxide) copolymer (along with any layers thereover or thereunder) are optimally (but not necessarily) placed on the side or sides that are covered with the chosen coating formulation (e.g. polyethylene and the like).

The ink-receiving layer of interest which is designed to provide the important benefits listed above may involve many different variants without limitation provided that: (1) at least one ink-receiving layer is employed, with this layer being composed entirely or partially of one or more poly (vinyl alcohol-ethylene oxide) copolymers; and (2) the ink-receiving layer is located on or within the claimed print media product so that it receives at least some of the ink materials thereon or therein which are delivered to the media product by the chosen printer unit. Accordingly, it is a novel and functionally important feature of this invention to provide a print media product which includes, at the very least, a substrate and at least one ink-receiving layer that is entirely or partially produced from at least one poly(vinyl alcohol-ethylene oxide) copolymer either in the layer or on top of it with both variants being encompassed within the invention. Nonetheless, at this time, preferred embodiments of the invention will now be summarized.

A first embodiment will encompass a print media product which includes the substrate listed with above with at least one ink-receiving layer positioned over and above or otherwise operatively attached to the substrate which comprises at least one poly(vinyl alcohol-ethylene oxide) copolymer. This composition again offers numerous important functions ranging from that of a binder to a drying time improvement additive without limitation. While the claimed invention shall not be restricted to any particular numerical quantities or amounts in connection with the poly(vinyl alcohol-ethylene oxide) copolymer, an exemplary and preferred embodiment designed to offer optimum results will involve the preparation of an ink-receiving layer that includes not less than about 70% by weight of the desired poly(vinyl alcohol-ethylene oxide) copolymer (about 80–90% by weight=optimum). The foregoing percentage values shall represent the total amount of poly(vinyl alcohol-ethylene oxide) copolymer being used whether a single composition is employed or multiple poly(vinyl alcohol-ethylene oxide) copolymers are used in combination. It should be noted that, unless otherwise stated herein, all percentage figures describing the material content of the various layers discussed in the claims, Summary of the Invention, and Detailed Description of Preferred Embodiments sections shall involve "dry weight", namely, the weight of the chosen component in the dried material layer of interest.

In the current embodiment, the ink-receiving layer discussed above may further comprise one or more additional ingredients therein combined with the claimed copolymer. For example, at least one pigment of a particulate or non-particulate character (organic or inorganic) may be employed within the ink-receiving layer. If this material is used, the ink-receiving layer will optimally include about 15–30% by weight pigment therein. Again, the foregoing percentage values (and all other numerical quantities expressed herein unless otherwise noted) shall involve the total amount of pigment in question whether a single pigment or multiple pigments in combination are employed. Further information and more specific data involving representative pigment compositions and combinations thereof will be set forth in the Detailed Description of Preferred Embodiments section. While the claimed invention shall not be restricted to the employment of any particular pigment materials or mixtures thereof, exemplary and preferred (non-limiting) pigments suitable for use in the ink-receiving layer or layers of this invention will involve the following compositions without limitation: silica (in precipitated, colloidal, gel, sol, or fumed form), cationic-modified silica (e.g. alumina-treated silica in an exemplary and non-limiting embodiment), cationic polymeric binder-treated silica, aluminum oxide, magnesium oxide, magnesium carbonate, calcium carbonate, pseudo-boehmite, barium sulfate, clay, titanium dioxide, gypsum, and mixtures thereof). It should also be understood that, while preferred in the current embodiment, the use of a pigment composition or compositions in the ink-receiving layer shall be considered optional in nature.

With continued reference to the non-limiting embodiment that is currently being discussed, while the claimed poly (vinyl alcohol-ethylene oxide) copolymer summarized herein exhibits a binder function along with other special capabilities, at least one or more additional binder materials (characterized herein as "supplemental binder compositions") can also be optionally included in the ink-receiving layer(s). The term "supplemental binder composition" shall be employed herein to involve binder materials other than the claimed poly(vinyl alcohol-ethylene oxide) copolymer. Likewise, the current embodiment shall not be limited to any particular types, quantities, or number of supplemental binder compositions. In a preferred and non-limiting version of the present embodiment, the ink-receiving layer will include about 10–30% by weight supplemental binder composition therein. Again, the foregoing percentage values (and all other numerical quantities expressed herein unless otherwise noted) shall involve the total amount of supplemental binder compositions(s) in question whether a single supplemental binder or multiple supplemental binders in combination are employed. Further information and more specific data pertaining to representative supplemental binder compositions and combinations thereof will be provided in the Detailed Description of Preferred Embodiments section. While the claimed invention shall not be restricted to the use of any particular supplemental binder compositions and mixtures thereof, exemplary and preferred examples of these materials include, without limitation, the following: polyvinyl alcohol and derivatives thereof, starch, SBR latex, gelatin, alginates, carboxycellulose materials, polyacrylic acid and derivatives thereof, polyvinyl pyrrolidone, casein, polyethylene glycol, polyurethanes (for example, a modified polyurethane resin dispersion), polyamide resins (for instance, an epichlorohydrin-containing polyamide), mixtures thereof, and others without restriction. It should also be understood that the use of supplemental binder compositions in the ink-receiving layer shall be considered optional in nature. Likewise, if multiple supplemental binder compositions are to be employed (e.g. at least two or more), a still further version of the present embodiment will involve a situation in which all of the supplemental binders being used are different from each other. For example, a mixture of (1) an epichlorohydrin-containing polyamide; and (2) a modified polyurethane resin dispersion combined with the chosen poly(vinyl alcohol-ethylene oxide) copolymer can provide favorable results. Again, the present invention shall not be restricted to this particular variant of the claimed print media sheet which is being summarized for example purposes only.

In summary and as outlined in considerable detail herein, the claimed ink-receiving layer shall encompass the use of at least one or more poly(vinyl alcohol-ethylene oxide) copolymers alone or with one or more additional ingredients. The present invention shall not be restricted to any particular additional ingredients or amounts thereof, with the following representative and non-limiting additional ingredients being employable if desired: (1) at least one pigment (without any supplemental binder compositions); (2) at least one supplemental binder composition (without any pigments); or (3) at least one pigment and at least one supplemental binder composition in combination. It should also be noted that any or all of the foregoing variants may incorporate one or more subsidiary additives ranging from surfactants to lubricant compositions and preservatives (discussed further below) if needed and desired as determined by routine preliminary testing. Likewise, the claimed invention shall not be restricted to any particular number of ink-receiving layers which contain the desired poly(vinyl alcohol-ethylene oxide) copolymer(s) which may range from one to multiple layers directly adjacent to each other or separated by one or more other material layers. As previously stated, it is preferred that the top/uppermost/outermost layer in the media products of the present invention involve the claimed ink-receiving layer which contains at least one poly(vinyl alcohol-ethylene oxide) copolymer. However, it is also contemplated that the ink-receiving layer or layers comprised of the claimed copolymer may be located anywhere on or within the print media products as needed and desired as along as such layer(s) can, in some fashion, receive all or part of the ink materials being delivered by the printer unit. All of these variations are again applicable to each of the other embodiments discussed herein as well as those which are covered by the claims set forth below.

Another embodiment is likewise of particular interest in this case, the selection of which will be based on routine preliminary pilot testing taking into account, for example, the type of ink to be used in connection with the print media products and other factors. All of the information, variants, potential layering arrangements, parameters, terms, definitions, and other items listed above relative to the first embodiment shall be applicable to and incorporated by reference in the alternative embodiment which will now be discussed. The key difference between the above-listed first embodiment and the embodiment to be summarized below involves the content of the ink-receiving layer. Basically, in the current embodiment of the claimed print media product, a substrate is again provided of substantially the same type as listed above. With reference to the ink-receiving layer, this structure is again positioned (e.g. provided) over and above the substrate or otherwise operatively attached thereto with "direct attachment" of this structure as defined herein being preferred but not necessarily required.

The ink-receiving layer in this embodiment is particularly unusual in that it preferably involves a structure consisting essentially of at least one poly(vinyl alcohol-ethylene oxide) copolymer as previously defined in connection with the first embodiment. Thus, all of the information presented above regarding the poly(vinyl alcohol-ethylene oxide) copolymer in connection with the first embodiment is equally applicable to and incorporated by reference in the present embodiment. In accordance with the phrase "consisting essentially of", the ink-receiving layer will not contain therein any pigments, fillers (of a particulate or non-particulate nature), supplemental binder compositions, or other materials in more than negligible/trace quantities (for example, those quantities that would incidentally be present as a result of the manufacturing processes being employed). In other words, the ink-receiving layer in the current embodiment will not include any pigments, fillers, or other materials therein aside from minute, trace amounts that would be considered inconsequential. Likewise, as a general proposition, the ink-receiving layer in this embodiment will not contain therein any composition(s) that would materially affect or alter any of the key characteristics listed above in connection with the use of a poly(vinyl alcohol-polyethylene oxide) copolymer. Such key characteristics include but are not restricted to gloss-control (with high gloss levels and gloss-uniformity being of primary interest under this category), excellent light-fastness, rapid drying time, the ability to control/prevent ink-coalescence problems, and the generation of clear, durable, smear-fast, and distinct printed images. In the current embodiment (which, while preferred and novel, shall not be considered the only embodiment in this case), it is therefore desired that the ink-receiving layer of interest be fabricated so that it is "copolymer only" from a material-content standpoint relative to the poly(vinyl alcohol-ethylene oxide) copolymer discussed herein (e.g. optimally about 100% by weight of at least one poly(vinyl alcohol-ethylene oxide) copolymer. This numerical value shall again involve the total quantity of poly(vinyl alcohol-ethylene oxide) copolymer being used whether only a single copolymer is employed or multiple poly(vinyl alcohol-ethylene oxide) copolymers are used in combination. However, in accordance with the definitions listed above, it is possible that additional materials (namely, preservatives, surfactants, and others) may be added to the ink-receiving layer as needed and desired provided that they again fit within the foregoing definitions with particular reference to the phrase "consisting essentially of" and the legal meaning of this term. It should also be noted that the ink-receiving layer(s) "consisting essentially of" at least one poly(vinyl alcohol-ethylene oxide) polymer are preferably the uppermost layer(s) in the print media product. However, they may again be placed in other locations on or within the print media product as long as they are able to receive thereon or therein at least some of the ink being delivered by the chosen printing system.

In a still further alternative embodiment, at least one additional (optional) material layer (e.g. one or more of such layers) can be positioned between said substrate and the ink-receiving layer(s) in the claimed print media products if needed and desired as determined by routine preliminary pilot testing. The use of this additional material layer is applicable to all of the embodiments discussed above and all others encompassed within the claimed subject matter. The content of this additional material layer can vary without limitation regarding the types and amounts of compositions which can be used therein. For example, the additional material layer can be comprised of at least one binder, at least one pigment, or mixtures thereof. Likewise, at least one poly(vinyl alcohol-ethylene oxide) copolymer can be used in the additional material layer alone or combined with various pigments, binders, combinations of pigments and binders, and other compositions (e.g. fillers, surfactants, etc.) without limitation. Again, one or more of the additional material layers can be used in this embodiment, with such layers also being appropriately characterized as "medial" or "intermediate" layers since, in the completed product, they will be located between the substrate and ink-receiving layer(s). In this regard, the additional material layer (if only one is used) will be secured by "direct attachment" (preferred but not required) to the substrate, with the ink-receiving layer (if only one is used) being secured by "direct attachment" (preferred but not required) to the additional material layer. However, it should generally be stated that the additional material layer is operatively attached to the substrate, with operative attachment as a basic term being defined above.

As a point of general information, the layers of materials associated with all of the embodiments expressed herein may be placed on only one side (preferred) of the coated or uncoated substrate or on both sides without limitation. If a coated substrate is employed, it is again particularly desirable to place the material layers on the coated side(s) as previously stated. Likewise, a number of different manufacturing techniques may be implemented in connection with the various embodiments of this invention without restriction as outlined further below. However, from a general standpoint, the claimed methods of interest regarding the above-listed embodiments will encompass the following basic steps (with the previously-described information involving construction materials, size parameters, and the like being incorporated by reference in the current discussion): (1) providing a substrate; and (2) applying at least one ink-receiving layer in position over and above the substrate. As previously discussed, the ink-receiving layer can involve a number of different formulations without limitation provided that it includes at least one poly(vinyl alcohol-ethylene oxide) copolymer therein. All of the information listed above regarding the ink-receiving layer formulations and the various embodiments associated therewith (including the materials, material quantities, and the like as previously discussed) are incorporated in this section by reference. In a first embodiment, the ink-receiving layer employed in the above-cited method includes at least one additional ingredient therein. For example, the poly(vinyl alcohol-ethylene oxide) copolymer(s) of interest may be combined with (A) at least one pigment; (B) at least one supplemental binder composition; or (C) a combination both materials (at least one pigment+at least one supplemental binder composition). While the present invention shall not be restricted to any particular numerical quantity values, it is preferred in the current "mixed" embodiment [e.g. where the poly(vinyl alcohol-ethylene oxide) copolymer is combined with one or more additional ingredients] that the ink-receiving layer be formulated to contain not less than about 70% by weight poly(vinyl alcohol-ethylene oxide) copolymer. Again, this value will involve the total amount of poly(vinyl alcohol-ethylene oxide) copolymer being used whether single or multiple poly(vinyl alcohol-ethylene oxide) copolymers are employed.

In another embodiment associated with the above-listed method, the ink-receiving layer will involve a structure "consisting essentially of" at least one poly(vinyl alcohol-ethylene oxide) copolymer with the term "consisting essentially of" being defined above and incorporated by reference in this section. In accordance with the phrase "consisting essentially of", the ink-receiving layer will not contain therein any pigments, fillers (of a particulate or non-particulate nature), supplemental binder compositions, or other materials in more than negligible/trace quantities (for example, those quantities that would incidentally be present as a result of the manufacturing processes being employed). In other words, the ink-receiving layer in the current embodiment will not include any pigments, fillers, or other materials therein aside from minute, trace amounts that would be considered inconsequential. Likewise, as a general proposition, the ink-receiving layer in this embodiment will not contain therein any composition(s) that would materially affect or alter any of the key characteristics listed above in connection with the use of a poly(vinyl alcohol-polyethylene oxide) copolymer. Such key characteristics include but are not restricted to gloss-control (with high gloss levels and gloss-uniformity being of primary interest under this category), excellent light-fastness, rapid drying time, the ability to control/prevent ink-coalescence problems, and the generation of clear, durable, smear-fast, and distinct printed images. In the current method (which, while preferred and novel, shall not be considered the only embodiment in this case), it is therefore desired that the ink-receiving layer of interest be fabricated so that it is "copolymer only" from a material-content standpoint relative to the poly(vinyl alcohol-ethylene oxide) copolymer discussed herein (e.g. optimally about 100% by weight of at least one poly(vinyl alcohol-ethylene oxide) copolymer. This numerical value shall again involve the total quantity of poly(vinyl alcohol-ethylene oxide) copolymer being used whether only a single copolymer is employed or multiple poly(vinyl alcohol-ethylene oxide) copolymers are used in combination. However, in accordance with the definitions listed above, it is possible that additional materials (namely, preservatives, surfactants, and others) may be added to the ink-receiving layer in this embodiment as needed and desired provided that they again fit within the foregoing definitions with particular reference to the phrase "consisting essentially of" and the legal meaning of this term.

The completed print media products described herein are designed to receive and retain a printed image thereon in a highly effective manner. The novel features discussed above individually and collectively constitute a significant advance in the art of image generation and print media technology. In particular, the unique structures, components, and methods of the invention with particular reference to the fabrication of an ink-receiving layer which includes therein at least one poly(vinyl alcohol-ethylene oxide) copolymer offer many important benefits compared with prior systems and products including but not limited to: (1) a high level of light-fastness, with the term "light-fastness" being generally defined herein to involve the capacity of a print media product to retain images thereon in a stable fashion without substantial fading, blurring, distortion, and the like over time in the presence of natural or made-made light; (2) rapid drying times in order to avoid smudging and image deterioration immediately after printing is completed due to contact with physical objects and the like; (3) the fast and complete absorption of ink materials in a manner which avoids image distortion caused by color bleed (e.g. the undesired migration of multi-colored ink components into each other) and related difficulties; (4) a highly water-fast character (with the term "water-fast" being generally defined to involve the ability of a print media product to produce a stable image with little or no fading, run-off, distortion, and the like when the image is placed in contact with moisture); (5) the generation of "crisp" images with a distinct and defined character; (6) the ability to produce printed products which are substantially "smear-fast", with this term being generally defined to involve the production of images that will not exhibit smearing, blurring, and the like when rubbed or otherwise physically engaged with a variety of objects ranging from the components of the printing apparatus being employed to the print operator's hands, fingers, and the like; (7) the control of an undesired condition known as "ink-coalescence" which is again defined herein to involve a phenomenon wherein wet ink droplets applied to an inkjet printing medium fail to spread sufficiently to eliminate the unprinted space between the droplets, thereby causing significant image deterioration problems; (8) the capacity to generate printed images with desired levels of gloss wherein the final product is characterized by uniform gloss levels throughout the entire image in order to achieve a professional and aesthetically-pleasing printed media sheet; (9) low material costs which enable the print media products of interest to be employed for mass market home and business use; (10) chemical compatibility with a wide variety of ink formulations which leads to greater overall versatility; (11) excellent levels of image stability and retention over long time periods; (12) minimal complexity from a production and material-content standpoint which leads to reduced fabrication costs and greater product reliability; and (13) a high level of gloss-control which is achievable in a rapid and effective manner during production through only minor adjustments in the manufacturing process. These and other benefits, objects, features, and advantages of the invention will become readily apparent from the following Brief Description of the Drawings and Detailed Description of Preferred Embodiments.

BRIEF DESCRIPTION OF THE DRAWINGS

The drawing figures provided herein are schematic, representative, and not necessarily drawn to scale. They shall not limit the scope of the invention in any respect. Reference numbers which are carried over from one figure to another shall constitute common subject matter in the figures under consideration. Likewise, the cross-hatching shown in the drawing figures is provided for example purposes only and shall not restrict the invention to any particular construction materials. In addition, the illustration of any given number of elements, components, layers, layering arrangements, layering sequences, and other structural features shall be considered representative only and shall not limit the invention in any respect unless otherwise expressly stated herein.

DETAILED DESCRIPTION OF PREFERRED EMBODIMENTS

Figure 1:
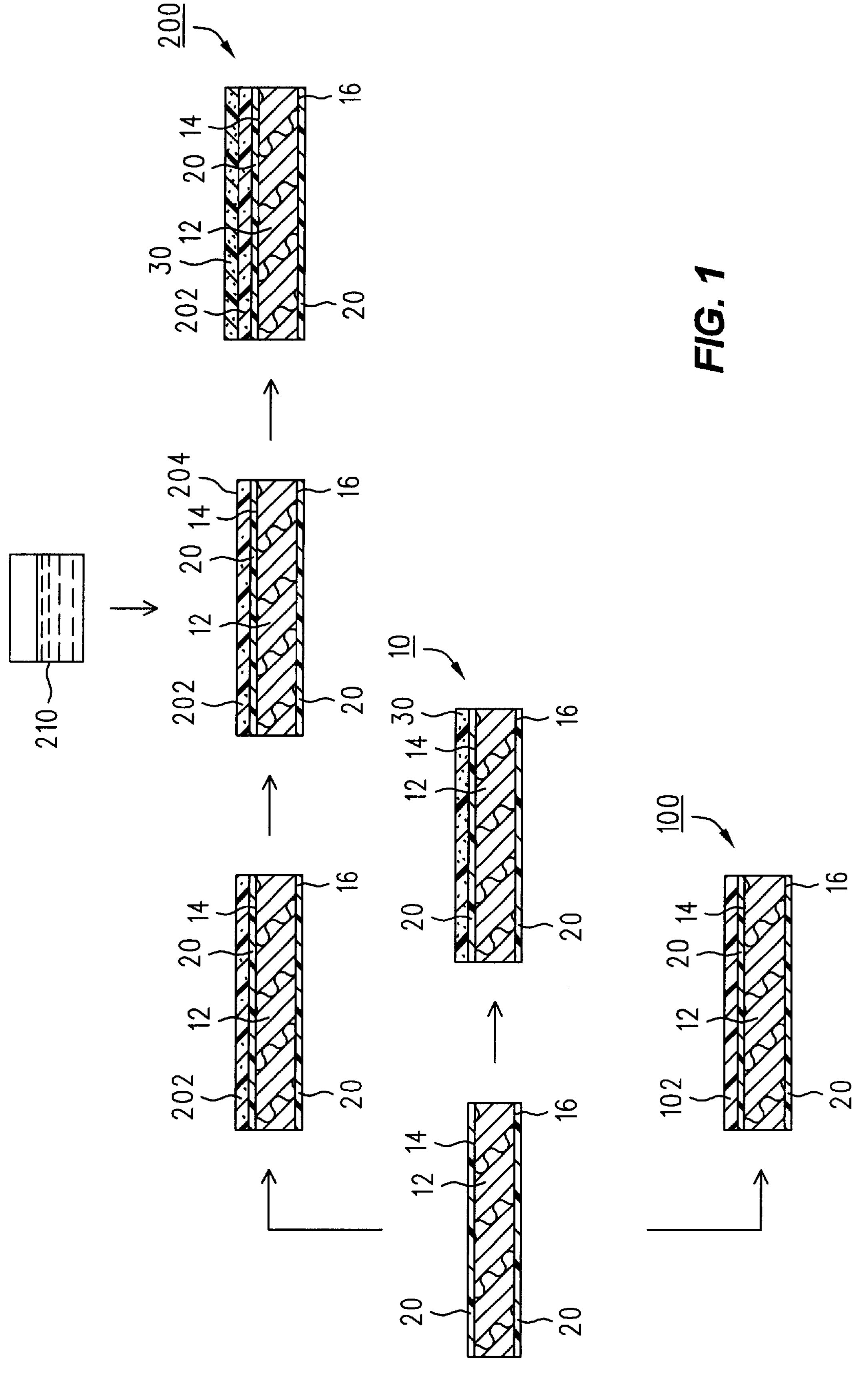
FIG. 1 is a schematically-illustrated, sequential view of the preferred process steps, materials, and techniques that are employed to produce the novel print media products of the present invention.

In accordance with the present invention, high-efficiency print media products (also characterized herein as "ink-receiving sheets") are provided which have multi-functional capabilities as noted above. In particular, the claimed media products offer multiple benefits in combination including but not limited to (A) the production of images that have a high degree of definition, clarity, and resolution; (B) rapid drying; (C) the ability to control ink-coalescence as defined above; (D) the capacity to generate images which rapidly achieve a high degree of smear-fastness; and (E) an excellent level of gloss and gloss-uniformity in order to generate a final imaged product having a uniform level of quality and visual clarity. Other benefits are likewise provided by the claimed invention as outlined above. In this regard, the various embodiments of the invention collectively constitute an advance in the print media and image generation fields.

Likewise, as previously stated, the print media products described herein are prospectively applicable to many different ink delivery systems and ink materials containing various dyes, pigments, toners (liquid and solid), and colorants. Of primary interest are ink delivery systems that employ thermal inkjet technology. Printing units using thermal inkjet technology again basically involve an apparatus which includes at least one ink reservoir chamber in fluid communication with a substrate (preferably made of silicon [Si] and/or other comparable materials) having a plurality of thin-film heating resistors thereon. The substrate and resistors are maintained within a structure that is conventionally characterized as a "printhead". Selective activation of the resistors causes thermal excitation of the ink materials stored inside the reservoir chamber and expulsion thereof from the printhead. Representative thermal inkjet systems are discussed in, for example, U.S. Pat. No. 4,771,295 to Baker et al. and U.S. Pat. No. 5,278,584 to Keefe et al. which are both incorporated herein by reference.

The ink delivery systems described above (and comparable printing units using thermal inkjet technology) typically include an ink containment unit (e.g. a housing, vessel, or tank) having a self-contained supply of ink therein in order to form an ink cartridge. In a standard ink cartridge, the ink containment unit is directly attached to the remaining components of the cartridge to produce an integral and unitary structure wherein the ink supply is considered to be "on-board" as shown in, for example, U.S. Pat. No. 4,771,295 to Baker et al. However, in other cases, the ink containment unit will be provided at a remote location within the printer, with the ink containment unit being operatively connected to and in fluid communication with the printhead using one or more ink transfer conduits. These particular systems are conventionally known as "off-axis" printing units. A representative, non-limiting off-axis ink delivery system is again discussed in, for example, U.S. Pat. No. 5,975,686 to Hauck et al. which is also incorporated herein by reference. The present invention as described herein is applicable to both on-board and off-axis systems (as well as any other types which include at least one ink containment vessel that is either directly or remotely in fluid communication with a printhead containing at least one ink-ejecting resistor therein). Furthermore, while the print media products described in this section will be discussed with primary reference to thermal inkjet technology, it shall be understood that they may be employed in connection with different ink delivery systems and methods including but not limited to piezoelectric drop devices of the variety disclosed in U.S. Pat. No. 4,329,698 to Smith and dot matrix units of the type described in U.S. Pat. No. 4,749,291 to Kobayashi et al., as well as other comparable and diverse systems designed to deliver ink using one or more ink delivery components/assemblies. In this regard, the claimed print media products and methods shall not be considered "print method-specific". As an additional point of information, exemplary printer units which are suitable for use with the print media products of the present invention include but are not limited to those manufactured and sold by the Hewlett-Packard Company of Palo Alto, Calif. (USA) under the following product designations: "DESKJET®" 400C, 500C, 540C, 660C, 693C, 820C, 850C, 870C, 895CSE, 970CSE, 1200C, and 1600C, as well as systems sold by the Hewlett-Packard Company under the "DESIGNJET®" trademark (5000 series), and others.

Furthermore, the claimed invention (namely, the novel print media products and production methods associated therewith) are not "ink-specific" and may be used in connection with a wide variety of inks, dyes, pigments, liquid and solid toner compositions, sublimation dyes, colorants, and the like without restriction. For example, representative ink compositions that can be employed in connection with the print media materials of this invention include but are not limited to those discussed in U.S. Pat. Nos. 4,963,189 and 5,185,034 (both incorporated herein by reference) which represent only a small fraction of the ink compositions and colorant formulations that can be used with the present invention.

At this point, a detailed discussion of the claimed print media products will now be presented with the understanding that the data set forth below shall be considered representative in nature, with the current invention being defined by the claims presented herein. It shall also be understood that the recitation of specific materials and embodiments that are identified as "preferred" constitute novel developments that provide optimum and unexpectedly effective results. Furthermore, all of the definitions, terminology, and other information recited above in the Summary of the Invention section are applicable to and incorporated by reference in the current Detailed Description of Preferred Embodiments section.

Figure 2:
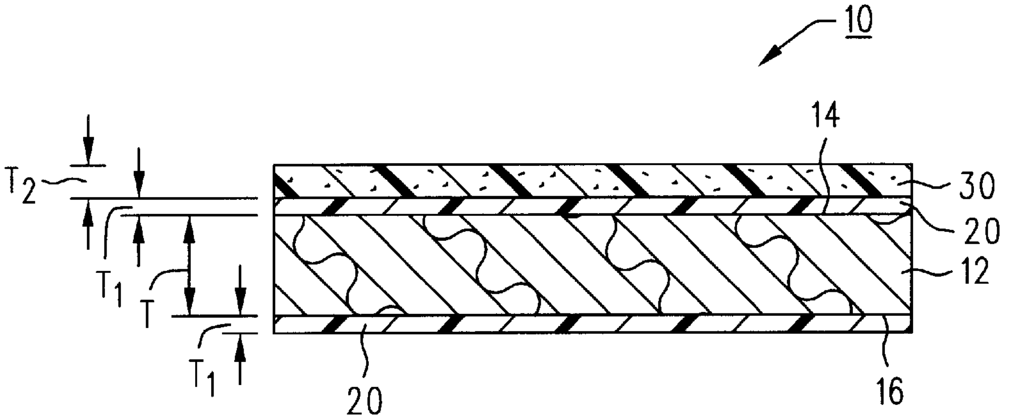
FIG. 2 is a schematically-illustrated and enlarged partial cross-sectional view of a completed print media product produced in accordance with a novel and preferred embodiment of the invention illustrating the material layers and thicknesses associated therewith.

In accordance with FIGS. 1 and 2, a preferred print media product in completed form for use as an image-receiving sheet is schematically illustrated at reference number 10. The methods, materials, process steps, and other data associated with print media product 10 will now be discussed which constitutes a representative and non-limiting preferred embodiment designed to produce excellent results. The print media product 10 is formulated to have a high-gloss character which is accomplished using the particular construction materials identified below. For general information purposes, the term "gloss" is basically defined to involve the relative proportion of light that is specularly reflected from a given product, surface, or region relative to the total amount of light that is reflected. High-gloss print media products are particularly desirable in the production of photographic-quality images for a wide variety of home and commercial uses. Likewise, employment of the special ingredient discussed below within the ink-receiving layer(s) of the print media product 10 is designed to yield, among other benefits as previously outlined herein, a high level of gloss-uniformity. The phrase "gloss-uniformity" as employed throughout this discussion shall generally be defined to involve the production of an image that has consistent and uniform gloss characteristics along and throughout its entire surface area with substantially no zones or regions of gloss that are higher or lower than any other regions on the product. In this manner, a printed media product 10 with a clear, crisp, uniform, and aesthetically pleasing image can be generated.

As illustrated in FIGS. 1–2, a support structure, "support", or "substrate" 12 (with all of such terms being considered equivalent from a structural and functional standpoint) is initially provided on which the other layers and materials associated with the print media product 10 reside. The substrate 12 is optimally fabricated in the form of a flexible sheet having an upper surface 14 (also characterized herein as a "first side") and a lower surface 16 (also characterized herein as a "second side"), with both of the surfaces/sides 14, 16 being substantially planar and having a uniform surface texture in the representative embodiment of FIG. 2. Likewise, the substrate 12 may be configured in roll, web, strip, film, or sheet form with transparent, semi-transparent, or opaque characteristics as needed and desired.

In a preferred version of the print media product 10 (which optimally involves the use of paper in sheet form as the substrate 12), the substrate 12 will have an exemplary and non-limiting uniform thickness "T" (FIG. 2) along its entire length of about 0.025–0.25 mm, with this range also being applicable to all of the other substrate materials discussed herein. Other construction compositions that can be employed in connection with the substrate 12 aside from paper include but are not limited to paperboard, wood, cloth, non-woven fabric, felt, ceramic compositions (optimally unglazed), metals (e.g. in foil form made from, for example, aluminum [Al], silver [Ag], tin [Sn], copper [Cu], mixtures thereof, and others as determined by the intended use of the completed print media product 10), and composites of such materials. Likewise, various organic polymer compositions can be employed in connection with the substrate 12 including but not limited to those fabricated from polyethylene, polystyrene, polyethylene terephthalate, polycarbonate resins, polytetrafluoroethylene (also known as "Teflon®"), polyimide, polypropylene, cellulose acetate, poly(vinyl chloride), and mixtures thereof without limitation.

However, as previously stated, commercially-available paper is preferred in connection with the substrate 12, with the present invention not being limited to any particular type of paper. In an exemplary and non-restrictive embodiment designed to offer optimum results (including a high degree of strength, flexibility, and durability), paper materials can be employed wherein at least one of the upper and lower surfaces (e.g. first and second sides) 14, 16 thereof (preferably the upper surface 14 which faces the various layers in the print media product 10 or both surfaces 14, 16) are coated with a substantially non-porous, non-absorbent, and ink-impermeable composition. In the representative embodiment illustrated schematically in FIG. 2, a coating layer 20 is provided on the upper and lower surfaces 14, 16 of the substrate 12 (e.g. made of paper). The coating layer 20 optimally has a uniform thickness "$T_1$" (FIG. 2) of about 1–40 $\mu$m, with this range being subject to change as needed and desired. Preferably, the coating layer 20 is produced from polyethylene although other compositions can be employed for this purpose without restriction including but not limited to various organic polymers such as polystyrene, polyethylene terephthalate, polycarbonate resins, polytetrafluoroethylene (Teflon®), polyimide, polypropylene, cellulose acetate, poly(vinyl chloride), and mixtures thereof. Again, while optional, the use of coating layer 20 can impart added strength and image clarity to the final print media product 10 although the coating layer 20 can be eliminated entirely on either or both surfaces 14, 16 of the substrate 12 if desired as again determined by routine preliminary pilot testing.

For the purposes of this invention, if a coated substrate 12 is employed as discussed above, the coating layer 20 shall be construed and defined as part of the substrate 12, with the representative thickness value "T" associated with the substrate 12 being suitably adjusted in this regard. Such a characterization is appropriate since coated paper materials including those discussed herein are traditionally available in pre-manufactured form from various paper suppliers and producers. For example purposes, a representative paper substrate 12 covered on both surfaces/sides 14, 16 with a coating layer 20 made of polyethylene is commercially available in completed form from Felix Schoeller Technical Papers, Inc. of Pulaski, N.Y. (USA) [product designations 108395, 108396, and 108397, for example].

With continued reference to FIGS. 1–2, an ink-receiving layer 30 is preferably applied (e.g. operatively attached) to the coating layer 20 on the upper surface 14 of the substrate 12 so that the ink-receiving layer 30 is positioned over and above the substrate 12 as illustrated. If the coating layer 20 was not employed on the substrate 12, the ink-receiving layer 30 in the embodiment of FIG. 2 would simply be placed on the upper surface 14. The ink-receiving layer 30 in the current embodiment is designed and configured for use as the "top", "uppermost", or "outermost" layer of material associated with the print media product 10 as previously defined. Likewise, in the current embodiment, the ink-receiving layer 30 is optimally (but not necessarily) configured for direct attachment to the coating layer 20/ upper surface 14 of the substrate 12. As previously noted, the term "direct attachment" is defined to involve affixation of the ink-receiving layer 30 to the coating layer 20/ upper surface 14 of the substrate 12 without any intervening material layers therebetween in order to minimize the number of material layers employed in the final print media product 10. However, it shall be understood that one or more intervening material layers can be used between the ink-receiving layer 30 and the substrate 12 (whether coated or uncoated) if needed and desired as determined by routine preliminary research. These intervening material layers can be made from a wide variety of different compositions without restriction as discussed in greater detail below relative to the embodiment of FIG. 4.

All of the embodiments described herein and shown in each of the drawing figures (FIGS. 1–4) are basically "one-sided" with the ink-receiving layer 30 and any layer(s) thereunder or thereover being located on only one side of the substrate 12 (e.g. the coating layer 20/ upper surface 14 ). Nonetheless, other print media products encompassed within this invention may involve placement of the foregoing layers on either or both sides of the substrate 12 (coated or uncoated) if needed and desired without limitation. In this regard, use of the phrase "on the substrate", "over and above the substrate", or "operatively attached to the substrate" when describing the layering arrangements of this invention shall encompass both "one-sided" and "dual-sided" media sheets with such language involving situations in which the subject layers are placed on either or both sides of the substrate 12. However, if a substrate 12 is employed which includes a coating layer 20 thereon as discussed herein, the ink-receiving layer 30 and any layer(s) thereunder or thereover are optimally (but not necessarily) placed on the side or sides of the substrate 12 that are coated with the layer 20.

From a functional standpoint, the ink-receiving layer 30 is designed to provide a high degree of "capacity" (e.g. ink-retention capability) in connection with the media product 10, to facilitate rapid drying of the printed, image-containing media product 10, to create a print media product 10 with a smooth/even surface, and to otherwise ensure that the desired degree of gloss is maintained in the finished product (preferably high gloss with uniform gloss characteristics). The ink-receiving layer 30 should likewise be able to substantially prevent ink-coalescence, with this term being defined above. Furthermore, the ink-receiving layer 30 should be able to generate smear-fast images (also defined above) using a wide variety of inks, colorant materials, pigments, dye dispersions, sublimation dyes, liquid or solid toner formulations, and other comparable chromatic (e.g. colored) or achromatic (black or white) materials without limitation.

In an exemplary and non-restrictive embodiment, the ink-receiving layer 30 will have a representative and non-limiting uniform thickness "$T_2$" (FIG. 2) along its entire length of about 1–50 μm although this range may be varied as necessary. From a material-content standpoint, the ink-receiving layer 30 in this embodiment (with other embodiments also being possible as noted below) includes a very special ingredient therein which is designed to facilitate the attainment of numerous important goals in a novel and effective manner including those recited above. This special ingredient and its use in the claimed ink-receiving layer 30 will now be discussed.

Specifically, the special ingredient which is able to offer the previously-listed benefits and others (including the capacity to function as an effective binder if other materials are also employed within the ink-receiving layer 30) involves at least one poly(vinyl alcohol-ethylene oxide) copolymer. The term "copolymer" is defined above. The poly(vinyl alcohol-ethylene oxide) copolymer to be employed in the ink-receiving layer 30 has the following basic chemical/polymeric structure:

$$-(CH_2CHOH)_x-(OCH_2CH_2)_y-$$

[wherein x=about 1000–8000, and y=about 10–500]

It should be noted and understood that the above-listed "x" and "y" values are presented for example purposes only and constitute representative/preferred embodiments in a non-limiting fashion. Such numbers may be subject to change if needed and desired in accordance with routine preliminary testing. Regarding the poly(vinyl alcohol-ethylene oxide) copolymer materials suitable for use in all embodiments of the current invention (including but not limited to those recited herein and illustrated in FIGS. 1–4), such materials have the following representative and preferred (e.g. non-limiting) features: good humid bleed characteristics/control (for example, less than about 15 mil), good light-fastness (for instance, greater than 4 years), better black optical density, better dry smear-fastness, good image gloss and distinctness of image, faster drying times, good ink-media compatibility, and better coalescence control capabilities. These characteristics again enable the claimed print media products (e.g. media product 10 and others expressed herein) to have numerous beneficial attributes including but not limited to high gloss levels with gloss-uniformity along the entire surface area of the print media product 10, the prevention of ink-coalescence, the achievement of rapid drying times, smear-fastness, and the like. An exemplary poly(vinyl alcohol-ethylene oxide) copolymer which may be used in all of the print media materials of this invention (including print media product 10 is commercially available from, for example, Nippon Gohsei of Osaka, Japan under the product designation "WO-320". It is not entirely and currently understood as to how ink-coalescence control, rapid drying times, gloss-uniformity, and the other benefits recited above are provided by the use of at least one poly(vinyl alcohol-ethylene oxide) copolymer in the ink-receiving layer 30 (and the other ink receiving layers set forth in the various alternative embodiments discussed below). However, it is currently believed that such benefits result from the good coating swellability provided by the claimed poly(vinyl alcohol-ethylene oxide) copolymer, with particular reference to the functional groups from the ethylene oxide constituent of the foregoing copolymer which provide better ink-media compatibility when ink is applied to the ink-receiving layer(s) of the invention. It shall therefore be understood that the use of at least one poly(vinyl alcohol-ethylene oxide) copolymer within the ink-receiving layer(s) of this invention constitutes a significant development with substantial functional benefits regardless of the other compositions and/or material layers used in combination therewith.

This embodiment of the present invention and the others discussed below shall not be limited to any particular amount of poly(vinyl alcohol-ethylene oxide) copolymer which is employed or the number of different poly(vinyl alcohol-ethylene oxide) copolymers that can be used in combination (e.g. one or more). All references to the term "poly(vinyl alcohol-ethylene oxide) copolymer" from this point forward shall encompass both a single poly(vinyl alcohol-ethylene oxide) copolymer or multiple poly(vinyl alcohol-ethylene oxide) copolymers in combination. Further data concerning preferred quantity values will be set forth later in this section.

With continued reference to the embodiment of FIG. 2, the ink-receiving layer 30 may again employ at least one or more additional ingredients in combination with the poly (vinyl alcohol-ethylene oxide) copolymer without restriction. For example, the copolymer may be combined in the ink-receiving layer 30 with at least one or more pigments (organic or inorganic) as discussed above. The term "pigment" shall generally be defined to involve a material which is used to impart color, opacity, and the like to a given formulation. Representative pigment materials which can be employed alone or together in combination with the claimed poly(vinyl alcohol-ethylene oxide) copolymer include but are not limited to silica (in precipitated, colloidal, gel, sol, and/or fumed form), cationic-modified silica (e.g. alumina-treated silica in an exemplary and non-limiting embodiment), cationic polymeric binder-treated silica, aluminum oxide, magnesium oxide, magnesium carbonate, calcium carbonate, pseudo-boehmite, barium sulfate, clay, titanium dioxide, gypsum, mixtures thereof, and others without limitation. An exemplary and preferred material which may be used as a pigment is silica as mentioned above (with particular reference to silica gel). Silica gel is typically fabricated by combining mineral acid materials with silicates (sodium silicate and the like). The resulting product consists of an aggregated network-type structure within a liquid medium. While the claimed invention (with particular reference to the ink-receiving layer 30 shall not be restricted to any types or grades of silica, a representative silica gel composition suitable for use therein will have an exemplary/preferred mean silica particle size (e.g. diameter) of about 0.3–0.4 $\mu$m in water and an exemplary/preferred mean porosity of about 0.8–0.9 cc/g which provides excellent results. This particular silica material is commercially available from, for example, Grace Davison, Inc. of Columbia, Md. (USA) under the product designation "GD009B". However, the above-listed recitation of silica in connection with the pigment material(s) to be employed in this particular embodiment is again being provided for example purposes only. It is also possible that the use of one or more pigments can be entirely eliminated from the ink-receiving layer 30 if desired (discussed further below). Likewise, the additional ingredient(s) to be employed in combination with the poly(vinyl alcohol-ethylene oxide) copolymer in the ink-receiving layer 30 can again involve a wide number, variety, and type without limitation ranging from pigments to fillers to supplemental binders and others.

It shall be understood that the ink-receiving layer 30 in the current embodiment (FIG. 2) may contain (1) at least one poly(vinyl alcohol-ethylene oxide) polymer; and (2) at least one pigment without any other materials or additives [especially since the poly(vinyl alcohol-ethylene oxide) copolymer is capable of performing a binder function]. However, the two classes of materials listed above can likewise be combined with one or more other additional ingredients if needed and desired as determined by routine preliminary pilot testing. For example, one of these additional ingredients can involve at least one extra (optional) organic or inorganic binder material (characterized herein as a "supplemental binder composition"). The term "binder" as used throughout this discussion shall generally involve compositions that have the ability to chemically, physically, and/or electrostatically retain one or more materials together in a given formulation or structure in order to provide mechanical strength, cohesiveness, and the like. Representative and non-limiting examples of supplemental binder compositions which may be employed alone or combined in the ink-receiving layer 30 of the current embodiment include: polyvinyl alcohol and derivatives thereof, starch, SBR latex, gelatin, alginates, carboxycellulose materials, polyacrylic acid and derivatives thereof, polyvinyl pyrrolidone, casein, polyethylene glycol, polyurethanes (for example, a modified polyurethane resin dispersion), polyamide resins (for instance, an epichlorohydrin-containing polyamide), mixtures thereof, and others without restriction.

Regarding the supplemental binder compositions listed above, some are of particular interest. For example, the following compositions are noteworthy: (1) polyvinyl alcohols; (2) polyurethanes; and (3) polyamide resins. The basic structural formula for polyvinyl alcohol is as follows: $-(CH_2CHOH)_x-$ [wherein x=about 1–3000 in a representative, non-limiting, and preferred embodiment] and is commercially available from numerous sources including but not limited to Nippon Gohsei of Osaka, Japan under the product designation "GOHSENOL NH-26". Exemplary and non-limiting derivatives of polyvinyl alcohol which may be encompassed within the "polyvinyl alcohol" class of materials that are suitable for use in the ink-receiving layer 30 (and other layers discussed herein) include but are not limited to unsubstituted polyvinyl alcohol as illustrated and discussed above, carboxylated polyvinyl alcohol, sulfonated polyvinyl alcohol, acetoacetylated polyvinyl alcohol, and mixtures thereof. Acetoacetylated polyvinyl alcohol has the following basic structural formula: $-(CH_2CHOH)_x-(CH_2CHOCOCH_2COCH_3)_y-$ [wherein x=about 1–3000 and y=about 1–100 in a representative, non-limiting, and preferred embodiment]. Acetoacetylated polyvinyl alcohol is commercially available from numerous sources including, for example, Nippon Gohsei of Osaka, Japan under the product designation "GOHSEFIMER Z 200".

Representative and non-limiting polyurethanes which may be encompassed within this class of materials that are suitable for use as a supplemental binder composition include but are not limited to the sub-class of compounds which would involve water-soluble or water-dispersible polyurethane polymers, water-soluble or water-dispersible modified polyurethane resin dispersions, and mixtures thereof. Of particular interest is the use of at least one modified polyurethane resin dispersion. The term "modified polyurethane resin dispersion" shall be generally defined herein to involve polyurethane polymers having hydrophobic groups associated therewith, wherein such materials are water-dispersible. This type of composition is particularly useful in the ink-receiving layer 30 of the current embodiment because of its ability to provide good water-resistance, a high degree of light-stability (e.g. light-fastness), and fast drying times. While many different modified polyurethane resin dispersions are commercially available from numerous sources (and are typically proprietary in nature), a modified polyurethane resin dispersion that is appropriate for use as a supplemental binder composition in the ink-receiving layer 30 alone or combined with the other supplemental binder materials set forth herein involves a product sold by Dainippon Ink and Chemicals/Dainippon International (USA), Inc. of Fort Lee, N.J. (USA) under the product designation "PATELACOL IJ-30". Further general information regarding this type of material (with particular reference to polyurethane dispersions/emulsions) is provided in Japanese Patent Publication No. 10-181189 which is incorporated herein by reference. However, the claimed invention shall not be exclusively limited to the foregoing specific material which is recited herein for example purposes only.

Regarding the employment of polyamide resins as supplemental binder compositions alone or combined with other binders in the ink-receiving layer 30 (or other material layers discussed herein), the following compounds can be encompassed within this class of materials without limitation: acrylic modified polyamides, acrylic polyamide copolymers, methacrylic modified polyamides, cationic polyamides, polyquaternary ammonium polyamides, epichlorohydrin-containing polyamides, and mixtures thereof. One composition of particular interest within this group is an epichlorohydrin-containing polyamide. The term "epichlorohydrin-containing polyamide" shall be generally defined herein to involve an epichlorohydrin group-containing polyamide formulation, with this composition having the following basic structural/chemical formula: $(C_6H_{10}O_4.C_4H_{13}N_3.C_3H_5ClO)_x$ [wherein x=about 1–1000 in a representative, preferred, and non-limiting formulation]. This type of material is of interest for use in the ink-receiving layer 30 and other layers associated with the print media product 10 (if desired as determined by routine preliminary pilot testing) because of its ability to provide a high level of ink/dye retention and affinity, along with rapid drying times. Epichlorohydrin-containing polyamides are commercially available from, for example, Georgia Pacific Resins, Inc. of Crossett, Ak. (USA) under the product designation "AMRES 8855". However, the present invention shall not be exclusively limited to this material which is likewise being provided for example purposes. Having discussed a number of preferred supplemental binder compositions, one representative ink-receiving layer 30 may consist essentially of or be comprised of (with particular reference to the legal meanings traditionally associated with such terms) the following binder mixture: (1) at least one poly(vinyl alcohol-ethylene oxide) copolymer; (2) at least one polyurethane resin dispersion; and (3) at least one epichlorohydrin-containing polyamide as previously described.

Regarding use of the above-listed materials in connection with the supplemental binder composition, it shall be understood that these compounds can be employed in any combination and are not the only chemicals that can be used as supplemental binder compositions with many others being applicable. Likewise, with respect to the ink-receiving layer 30 in the current embodiment [which involves the use of at least one poly(vinyl alcohol-ethylene oxide) copolymer combined with at least one other ingredient], this embodiment may not employ any supplemental binder compositions at all. The ink-receiving layer 30 can instead simply contain, for example, at least one poly(vinyl alcohol-ethylene oxide) copolymer combined with at least one pigment. Conversely, the ink-receiving layer 30 can be produced from at least one poly(vinyl alcohol-ethylene oxide) copolymer in combination with at least one supplemental binder composition without any pigment compositions if desired. Thus, many different variations and alternatives are possible in connection with the embodiment of FIG. 2 which shall not be limited provided that at least one poly(vinyl alcohol-ethylene oxide) copolymer is employed in combination with at least one other ingredient (either one or more pigments, one or more supplemental binder compositions, and/or various subsidiary additives/ingredients that are primarily designed to perform non-pigment and non-binder functions).

With respect to the subsidiary additives mentioned above which are primarily designed to perform non-pigment and non-binder functions, a number of such compositions can be used as again determined by routine preliminary pilot testing. For example, these additives include but are not limited to the following materials: fillers, surfactants, lubricants, light-stabilizers, preservatives (e.g. antioxidants), general stabilizers, and the like (along with mixtures thereof) without limitation. While these additives may be contained within the ink-receiving layer 30 in variable amounts, they should again be considered optional and employed on an "as needed" basis. Furthermore, they may be used in the ink-receiving layer 30 having the claimed poly(vinyl alcohol-ethylene oxide) copolymer therein whether or not the layer 30 also includes any pigments and/or supplemental binder compositions.

As far as material quantities are concerned in connection with the embodiment of FIG. 2, the present invention shall not be restricted to any particular amounts which shall be determined in accordance with routine analysis. However, a preferred and non-limiting version of this embodiment will involve a situation in which the ink-receiving layer 30 will contain not less than about 70% by weight poly(vinyl alcohol-ethylene oxide) copolymer (optimally about 80–90% by weight). The foregoing percentage values (and all other numerical quantities expressed herein unless otherwise noted) shall involve the total amount of the ingredient in question whether a single ingredient [e.g. one poly(vinyl alcohol-ethylene oxide) copolymer] or multiple ingredients [namely, a plurality of poly(vinyl alcohol-ethylene oxide) copolymers] in combination are employed. For example, if an 80% by weight value is used in connection with the poly(vinyl alcohol-ethylene oxide) copolymer, this shall involve a situation where 80% by weight of a single poly (vinyl alcohol-ethylene oxide) copolymer may be employed or multiple poly(vinyl alcohol-ethylene oxide) copolymers with differing numerical constituent values in combination can be used which collectively constitute (as a total) 80% by weight of the dried ink-receiving layer 30. Likewise, unless otherwise expressed herein, all percentage quantity figures mentioned throughout this discussion shall be on a "dry weight" basis as a percentage of the entire dried layer of concern (e.g. the ink-receiving layer 30 in this embodiment).

If at least one pigment and at least one supplemental binder composition are employed together within the ink-receiving layer 30 along with the poly(vinyl alcohol-ethylene oxide) copolymer, then the following preferred and non-limiting dry weight percentages are employed: about 5–15% by weight pigment and about 10–15% by weight supplemental binder composition. If no supplemental binder compositions are used but at least one pigment is present, then the amount of pigment composition will be increased to about 15–30% by weight to account for the non-presence of the supplemental binder composition. Likewise, if no pigments are employed, the quantity of the supplemental binder composition will be raised to about 15–30% by weight to account for the lack of any pigment materials therein. As a representative and non-limiting example, the ink-receiving layer 30 may be comprised or consist essentially of the following binder materials: (1) at least one poly(vinyl alcohol-ethylene oxide) copolymer (about 74–94% by weight [optimum=about 84% by weight]); (2) at least one polyurethane resin dispersion (about 5–15% by weight [optimum=about 10% by weight]); and (3) at least one epichlorohydrin-containing polyamide (about 1–12% by weight [optimum=about 6% by weight]).

Finally, regarding the amounts of any subsidiary additives/ingredients in the ink-receiving layer 30 as defined above (e.g. fillers, preservatives, etc.), the combined total amount of such materials as a group within the ink-receiving layer 30 will normally be about 1–5% by weight. If one or more of these subsidiary additives/ingredients are employed, then all of the above-listed compositions aside from the poly(vinyl alcohol-ethylene oxide) copolymer may be reduced proportionately to account for the addition of such items. It should again be emphasized that the foregoing percentage values are provided for example purposes only in a non-limiting fashion and constitute preferred numbers designed to produce effective results. Likewise, as previously stated, all of the foregoing percentage values regarding the various other ingredients that can be employed within the ink-receiving layer 30 (including pigments, supplemental binder compositions, and the like) shall involve the total amount of the ingredient in question whether a single ingredient [e.g. one pigment or binder] or multiple ingredients [namely, a plurality of pigments or binders] in combination are used. It should also be noted that, regarding the preferred minimum and other quantity values expressed above in connection with the claimed poly(vinyl alcohol-ethylene oxide) copolymer, such values may be decreased or increased as desired in accordance with routine preliminary testing.

A number of different techniques may be employed to apply or otherwise deliver the ink-receiving layer 30 in position over and above the substrate 12 (and/or coating layer 20 associated therewith if present). Representative application methods which can be chosen for this purpose include but are not limited to the use of a conventional slot-die processing system, meyer bar apparatus, curtain coating system, rod coating device, or other comparable techniques/devices including those that employ circulating and non-circulating coating technologies. An exemplary coating weight range associated with the ink-receiving layer 30 (irrespective of the coating method that is employed) is about 5–13 g/m$^2$ (optimum=about 9 g/m$^2$). However, the claimed invention and its various embodiments shall not be restricted to any particular layer application/formation methods (and coating weights) with a number of different alternatives being employable for this purpose.

Following application of the ink-receiving layer 30 onto the substrate 12 (and/or coating layer 20 associated therewith), the ink-receiving layer 30 is preferably dried. This may be accomplished by heating the substrate 12/layer 30 combination at a preferred and non-limiting temperature of about 80–120° C. within a conventional oven-type heating apparatus of a variety normally used for fabricating sheet-type print media products, with the foregoing substrate 12/layer 30 combination moving through the heating apparatus at a representative "web speed" of about 50–150 ft/minute. However, it shall also be understood that other drying methods may be employed without limitation provided that the layer 30 is effectively dried at this stage. The overall thickness of the print media product 10 illustrated schematically in FIG. 2 may readily be determined by simply adding up all of the above-listed thickness values "T", "$T_1$", and "$T_2$" associated with the substrate 12, coating layer 20 (if used), and ink-receiving layer 30, respectively. The total thickness of the print media product 10 may, of course, be appropriately varied depending on the number of any additional layers that may be employed within the print media product 10.

Figure 3:
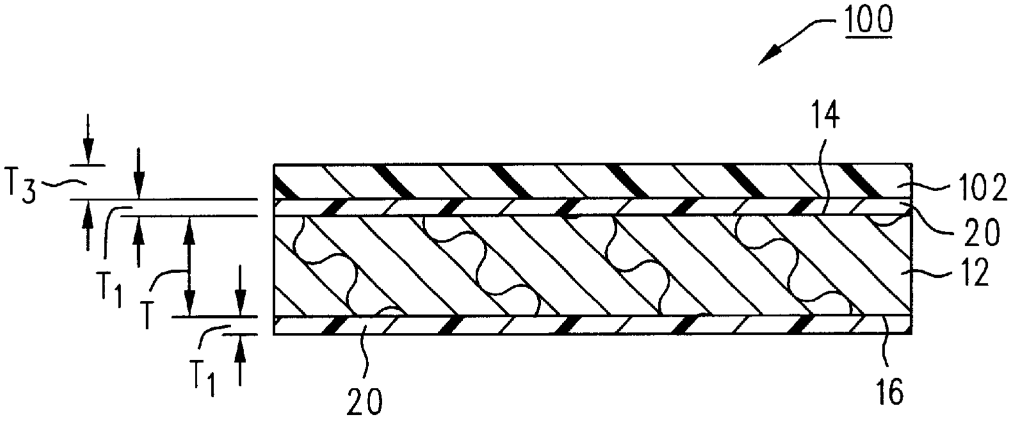
FIG. 3 is a schematically-illustrated and enlarged partial cross-sectional view of a completed print media product produced in accordance with a novel and preferred alternative embodiment of the invention illustrating the material layers and thicknesses associated therewith.

As stated throughout the current discussion, a variety of different versions of this invention are possible provided that at least one ink-receiving layer is employed which contains at least one poly(vinyl alcohol-ethylene oxide) copolymer. This layer may be located anywhere on or within the media product, provided that it is able to receive at least some of the ink materials being delivered. Two alternative embodiments of the invention will now be discussed. Both of these embodiments will involve all of the information, materials, numerical parameters, ink-receiving layer and substrate thickness values, fabrication techniques, term-definitions, procedures, and other items expressed above in connection with the first embodiment (e.g. the embodiment of FIG. 2) and are incorporated in the current discussion by reference (unless otherwise stated herein). Thus, the foregoing information will not be repeated. In fact, the only difference between the embodiment of FIG. 2 and the embodiment which will now be discussed (as shown in FIG. 3) will involve the material content of the ink-receiving layer. In the present embodiment, the print media product will be identified at reference number 100, with the ink-receiving layer being denoted at reference number 102 for the sake of clarity. Component numbers carried forward from one embodiment to another (e.g. from the embodiment of FIG. 2 to the embodiments of FIGS. 3 and 4) shall represent structures which are common to all embodiments.

The ink-receiving layer 102 as schematically illustrated in FIG. 3 has a uniform thickness "$T_3$" along its entire length which is substantially the same as the thickness "$T_2$" of the ink-receiving layer 30 in the embodiment of FIG. 2 (namely, about 1–50 $\mu$m in a representative and non-limiting example). However, in this embodiment, the ink-receiving layer 102 has a different material-content compared with ink-receiving layer 30, with ink-receiving layer 102 "consisting essentially of" at least one poly(vinyl alcohol-ethylene oxide) copolymer. In accordance with the phrase "consisting essentially of" in the presently-described embodiment, the ink-receiving layer 102 will not contain therein any pigments, fillers (of a particulate or non-particulate nature), supplemental binder compositions, or other materials of any kind in more than negligible/trace quantities (for example, those quantities that would incidentally be present as a result of the manufacturing processes being employed). In other words, the ink-receiving layer 102 in the current embodiment/method will not include any pigments, fillers, or other materials therein aside from minute, trace amounts that would be considered inconsequential. Likewise, as a general proposition, the ink-receiving layer 102 in this embodiment will not contain therein any composition(s) that would materially affect or alter any of the key characteristics listed above in connection with the use of at least one poly(vinyl alcohol-polyethylene oxide) copolymer. Such key characteristics include but are not restricted to gloss-control (with high-gloss levels and gloss-uniformity being of primary interest under this category), excellent light-fastness, ink coalescence-control, rapid drying time, and the generation of clear, durable, smear-fast, and distinct printed images. However, it is possible that additional materials (namely, preservatives, surfactants, and others) may be added to the ink-receiving layer 102 as needed and desired provided that they again fit within the foregoing definitions of the phrases "consisting essentially of" (and "consists essentially of" which shall be deemed equivalent.) Likewise, in the present embodiment, it preferred that the ink-receiving layer 102 be fabricated so that it is basically "copolymer only" from a material-content standpoint relative to the poly(vinyl alcohol-ethylene oxide) copolymer discussed herein [e.g. optimally about 100% by weight of at least one poly(vinyl alcohol-ethylene oxide) copolymer.] However, all of the information listed above should again be construed in accordance with the definitions and standard usage of the phrase "consisting essentially of" as employed herein.

Regarding application methods and fabrication techniques, it shall be understood that all of the information listed above concerning the embodiment of FIG. 2 is equally applicable to the current embodiment of FIG. 3, with such information being incorporated herein by reference. Specifically, a number of different methods may be employed to apply or otherwise deliver the ink-receiving layer 102 in position over and above the substrate 12 (and/or coating layer 20 associated therewith if present). Representative application techniques which can be chosen for this purpose include but are not limited to the use of a conventional slot-die processing system, meyer bar apparatus, curtain coating system, rod coating device, or other comparable methods including those that employ circulating and non-circulating coating technologies. An exemplary coating weight range associated with the ink-receiving layer 102 (irrespective of the coating method that is employed) is about 15–25 g/m$^2$ (optimum=about 20 g/m$^2$). However, the claimed invention and its various embodiments shall not be restricted to any particular layer application/formation methods (and coating weights) with a number of different alternatives being employable for this purpose.

Following application of the ink-receiving layer 102 onto the substrate 12 (and/or coating layer 20 associated therewith), the ink-receiving layer 102 is preferably dried (optimally in the same manner discussed above in connection with the ink-receiving layer 30). This may be accomplished by heating the substrate 12/layer 102 combination at a preferred and non-limiting temperature of about 80–120° C. within a conventional oven-type heating apparatus of a variety normally used for fabricating sheet-type print media products, with the foregoing substrate 12/layer 102 combination moving through the heating apparatus at a representative "web speed" of about 50–150 ft/minute. However, it shall also be understood that other drying methods may be employed without limitation provided that the layer 102 is effectively dried at this stage.

As a further note concerning this embodiment, the selection to use it will again depend on numerous factors ranging from the chemical nature of the ink materials being delivered to the type of printing system under consideration. However, employment of the embodiment of FIG. 3 (and the specialized ink-receiving layer 102 associated therewith) is particularly desirable and useful in situations where drying time and smear-fastness are of primary importance as characteristics in the final product. Likewise, the ink-receiving layer 102 can be used alone as the sole material layer in connection with the print media product 100 or in combination with one or more other material layers located above or below the layer 102 provided that the layer 102 is able to receive at least some of the ink materials of interest thereon or therein.

Figure 4:
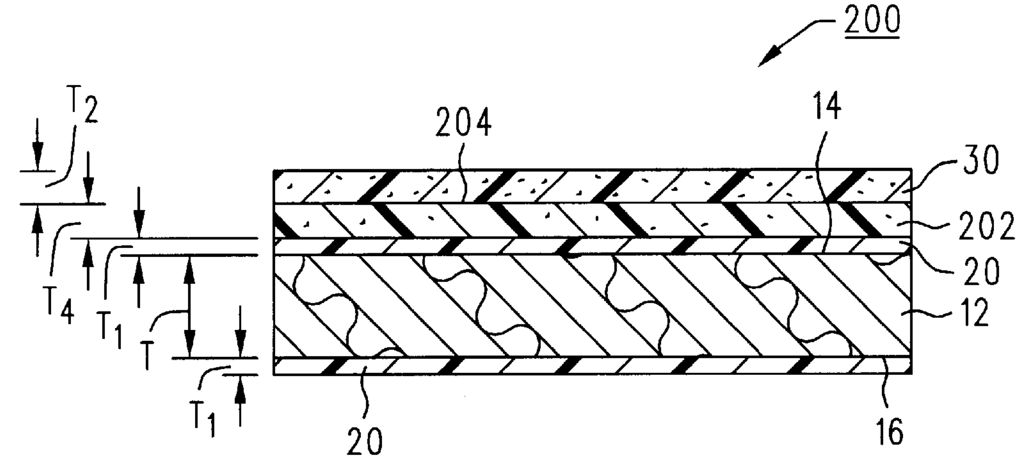
FIG. 4 is a schematically-illustrated and enlarged partial cross-sectional view of a completed print media product produced in accordance with a novel and preferred further alternative embodiment of the invention illustrating the material layers and thicknesses associated therewith.

A still further embodiment of the claimed invention will now be discussed. As previously noted, the print media products 10, 100 may contain at least one additional layer of material located above or below the ink-receiving layers 30, 102. A non-limiting example of a print media product 200 which employs an additional layer of material is schematically illustrated in FIG. 4. This additional or intermediate layer (shown at reference number 202) is positioned over and above (e.g. operatively attached to) the upper surface 14 of the substrate 12 (with or without the coating layer 20 thereon). In a preferred (but not required) embodiment, the additional layer 202 is "directly affixed" to the upper surface 14/coating layer 20, with this phrase being defined herein to involve direct attachment of such components without any intervening materials or layers therebetween. Likewise, the chosen ink-receiving layer [e.g. layer 30, 102 or other selected ink-receiving layer containing at least one poly (vinyl alcohol-ethylene oxide) copolymer] is positioned over and above the upper surface 204 (FIG. 4) of the additional layer 202 with "direct affixation" of such components being preferred (although not required). While the embodiment of FIG. 4 shows the use of ink-receiving layer 30, this structure may be replaced with ink-receiving layer 102 [or any other ink-receiving layer containing the desired poly(vinyl alcohol-ethylene oxide) copolymer.] It shall also be understood that various further layers of material (not shown) may be located below the additional layer 202 (between the layer 202 and substrate 12) or above the additional layer 202 (between the layer 202 and ink-receiving layer 30) without limitation. A representative and non-limiting thickness value "$T_4$" associated with the additional layer 202 will be about 1–50 $\mu$m.

The additional layer 202 may be made from a number of different compositions (e.g. pigments, binders, fillers, surfactants, lubricants, light-stabilizers, preservatives, general stabilizers, and the like alone or combined without restriction). In particular, all of the compositions recited above in connection with the ink-receiving layer 30 may also be employed within the additional layer 202 [including at least one poly(vinyl alcohol-ethylene oxide) copolymer if desired.] In this regard, exemplary pigments will include silica (in precipitated, colloidal, gel, sol, and/or fumed form), cationic-modified silica (e.g. alumina-treated silica in an exemplary and non-limiting embodiment), cationic polymeric binder-treated silica, aluminum oxide, magnesium oxide, magnesium carbonate, calcium carbonate, pseudo-boehmite, barium sulfate, clay, titanium dioxide, gypsum, mixtures thereof, and others without limitation. Representative binders will involve polyvinyl alcohol and derivatives thereof, starch, SBR latex, gelatin, alginates, carboxycellulose materials, polyacrylic acid and derivatives thereof, polyvinyl pyrrolidone, casein, polyethylene glycol, polyurethanes (for example, a modified polyurethane resin dispersion), polyamide resins (for instance, an epichlorohydrin-containing polyamide), mixtures thereof, and others without limitation.

It shall be understood that the additional layer 202 can encompass numerous materials and material quantities without limitation, with the additional layer 202 being described in connection with multiple alternatives to convey the understanding that the content of layer 202 shall not be restricted to any given formulations. For instance, in a non-limiting representative embodiment, the additional layer 202 can employ the following pigment and binder quantities: about 67–87% by weight pigment (e.g. silica) with about 77% by weight being preferred, and about 13–33% by binder (e.g. polyvinyl alcohol) with about 23% by weight being preferred. Should any additional/optional ingredients and/or at least one poly(vinyl alcohol-ethylene oxide) copolymer be used within the additional layer 202, the relative quantities of the pigment(s) and binder(s) recited above would be proportionately reduced to account for any added components. Alternatively, instead of reducing the amounts of both the pigment(s) and binder(s), either one of the pigment(s) or binder(s) could be reduced in quantity on an individual basis to account for the added ingredient(s) if desired. Likewise, the additional layer 202 can involve the use of at least one pigment (without any binders), at least one binder (without any pigments), or may consist essentially of at least one poly(vinyl alcohol-ethylene oxide) copolymer and thus have the same material-content as the ink-receiving layer 102. In this regard, all of the information recited above in connection with ink-receiving layers 30, 102 is applicable and incorporated by reference relative to the additional layer 202.

A number of different methods may be employed to apply or otherwise deliver the additional layer 202 in position over and above the substrate 12 (and/or coating layer 20 associated therewith if present). Representative application techniques which can be chosen for this purpose include but are not limited to the use of a slot-die processing system, meyer bar apparatus, curtain coating system, rod coating device, or other comparable methods including those that employ circulating and non-circulating coating technologies. An exemplary coating weight range associated with the additional layer 202 (irrespective of the coating method that is employed) is about 17–27 $g/m^2$ (optimum=about 22 $g/m^2$). However, the claimed invention and its various embodiments shall not be restricted to any particular layer application/formation methods (and coating weights) with a number of different alternatives being employable for this purpose. Following application of the additional layer 202 onto the substrate 12 (and/or coating layer 20 associated therewith), the layer 202 is optimally dried. This may be accomplished by heating the substrate 12/layer 202 combination at a preferred and non-limiting temperature of about 80–120° C. within a conventional oven-type heating apparatus of a variety normally used for fabricating sheet-type print media products, with the foregoing substrate 12/layer 202 combination moving through the heating apparatus at a representative "web speed" of about 50–150 ft/minute. However, it shall also be understood that other drying methods may be employed without limitation provided that the layer 202 is effectively dried at this stage.

Thereafter, the chosen ink-receiving layer [e.g. layers 30, 102 or other desired ink-receiving layer having at least one poly(vinyl alcohol-ethylene oxide) copolymer therein] can be applied/delivered onto the upper or top surface 204 of the additional layer 202 so that it is operatively attached thereto. This step may be accomplished using the techniques, methods, operational parameters, web speeds, coating weights, and other information (including drying steps/temperatures and the like) which are listed above in the two prior embodiments relative to layers 30, 102. Accordingly, such information shall be incorporated in the current discussion by reference.

As an additional point of information, an optional intermediate step may be implemented prior to delivery of the chosen ink-receiving layer 30, 102 onto the additional layer 202. This step (as schematically illustrated in FIG. 1) involves the delivery of a supply of an aqueous citric acid solution 210 over all or part of the top surface 204 of the additional layer 202 preferably after the layer 202 is dried so that at least part of the top surface 204 is re-wetted. In an exemplary and non-restrictive embodiment, the solution 210 will contain about 0.7% by weight citric acid in water (with the foregoing % by weight value in this instance not involving "dry weight" as discussed above since an aqueous solution is involved). Regarding the amount of solution 210 that is delivered, any quantity will be adequate provided that a sufficient supply is delivered to uniformly wet the top surface 204 of the additional layer 202 over its entire length and width or in the desired particular locations thereon. However, in a representative and non-limiting example designed to provide effective results, 1 kg of completed 0.7% by weight citric acid solution as discussed above will be used (e.g. uniformly applied) per 500 $ft^2$ of the additional layer 202, although other quantities may again be employed as determined by routine preliminary testing. The purpose of this step is to avoid bubble formation in the ink-receiving layers 30, 102 to be applied which is effectively accomplished using the above-listed citric acid solution 210. As a result, it is further ensured that the ink-receiving layers 30, 102 will have a uniform consistency which facilitates proper image formation.

At this point, the basic manufacturing process is completed regarding all of the embodiments recited above. From a physical, chemical, and structural standpoint, the ink-receiving layers produced in accordance with the invention [namely, those that include therein at least one poly(vinyl alcohol-ethylene oxide) copolymer particularly at the numerical quantities recited herein] can be expected in most cases to have the following important characteristics: an average drying time of less than about three (3) minutes and a specular gloss of >about 60 at 20° (as measured by a Micro-TRI-Gloss meter [P/N GB4520] from BYK Gardner USA of Columbia, Md. [USA]), with the foregoing numerical parameters being non-limiting but preferred.

The following specific Examples are provided as preferred versions of the claimed print media products that are designed to deliver optimum results. It shall be understood that the recitation of these Examples will not limit the invention in any respect.

EXAMPLE 1

In this Example (which corresponds to the print media product 10 of FIG. 2), the substrate 12 is constructed from paper coated on both surfaces/sides 14, 16 with a coating layer 20 of polyethylene. The thickness values associated with the substrate 12, coating layer 20, and ink-receiving layer 30 are within the ranges specified above.

TABLE A

Ink-Receiving Layer

| Component | % By Dry Weight in Layer |
|---|---|
| Poly(vinyl alcohol-ethylene oxide) copolymer | 70 |
| Silica (Pigment) | 15 |
| Polyvinyl alcohol (Suppt'l binder) | 15 |
| | 100 |

EXAMPLE 2

In this Example (which corresponds to the print media product 100 of FIG. 3), the substrate 12 is constructed from paper coated on both surfaces/sides 14, 16 with a coating layer 20 of polyethylene. The thickness values associated with the substrate 12, coating layer 20, and ink-receiving layer 102 are within the ranges specified above.

TABLE A

Ink-Receiving Layer

| Component | % By Dry Weight in Layer |
|---|---|
| Poly(vinyl alcohol-ethylene oxide) copolymer | 100 |
| | 100 |

EXAMPLE 3

In this Example (which corresponds to the print media product 200 of FIG. 4), the substrate 12 is constructed from paper coated on both surfaces/sides 14, 16 with a coating layer 20 of polyethylene. The thickness values associated with the substrate 12, coating layer 20, ink-receiving layers 30, 102, and additional layer 202 in this Example are within the ranges specified above.

TABLE A

| Ink-Receiving Layer | |
|---|---|
| Component | % By Dry Weight in Layer |
| (Same formulations as those listed above in connection the ink-receiving layers in Examples 1 and 2, either of which may be used in this Example). | |

TABLE B

| Additional (Intermediate) Layer | |
|---|---|
| Component | % By Dry Weight in Layer |
| Silica (Pigment) | 77 |
| Polyvinyl alcohol (Binder) | 23 |
| | 100 |

In summary and from a general standpoint, the basic method of interest with reference to all of the foregoing embodiments will generally involve the following steps: (1) providing a substrate; (2) applying an ink-receiving layer in position over and above the substrate or, more generally, operatively attaching the ink-receiving layer to the substrate. The ink receiving layer will, in a primary embodiment, comprise at least one poly(vinyl alcohol-ethylene oxide) copolymer therein. As previously stated, it is also possible to include in combination with the claimed copolymer (A) at least one pigment; (B) at least one supplemental binder composition; or (C) both (A) and (B). Likewise, the ink-receiving layer may be of a construction "consisting essentially of" at least one poly(vinyl alcohol-ethylene oxide) copolymer as previously discussed.

In a still further embodiment, at least one additional or intermediate layer of material (e.g. additional layer 202) may be applied in position over and above the substrate prior to application of the ink-receiving layer. Specifically, this step involves placing the additional layer between the substrate and ink-receiving layer so that the additional layer is operatively attached to the substrate and ink-receiving layer. One further step which may be employed involves delivering a citric acid solution (e.g. about 0.7% by weight citric acid in a preferred and non-limiting version of the invention) onto part or (preferably) all of the top surface of the additional layer prior to delivery of the ink-receiving layer thereover. It has been discovered that the use of this particular solution can again assist in avoiding undesired bubble formation in the completed products.

Having herein set forth preferred embodiments of the invention, it is anticipated that various modifications may be made thereto by individuals skilled in the relevant art which nonetheless remain within the scope of the invention. For example, the invention shall not be limited to any particular ink delivery systems, operational parameters, numerical values, dimensions, ink compositions, layering arrangements, print media components, substrates, material proportions/quantities, and component orientations unless otherwise stated herein. The present invention shall therefore only be construed in accordance with the following claims.

The invention that is claimed is:

1. A print media product comprising:

a substrate; and at least one ink-receiving layer positioned over and above said substrate, said ink-receiving layer being comprised of at least one poly(vinyl alcohol-ethylene oxide) copolymer.

2. The print media product of claim 1 wherein said ink-receiving layer comprises not less than about 70% by weight said poly(vinyl alcohol-ethylene oxide) copolymer.

3. The print media product of claim 1 wherein said ink-receiving layer further comprises at least one pigment therein.

4. The print media product of claim 1 wherein said ink-receiving layer further comprises at least one supplemental binder composition therein.

5. The print media product of claim 4 wherein said supplemental binder composition is comprised of a plurality of binder materials in combination, with each of said binder materials being different from each other.

6. The print media product of claim 1 wherein said print media product further comprises at least one additional material layer positioned between said substrate and said ink-receiving layer.

7. The print media product of claim 6 wherein said additional material layer is comprised of a composition selected from the group consisting of at least one pigment, at least one binder, and mixtures thereof.

8. The print media product of claim 1 wherein said substrate is comprised of paper, said substrate further comprising a first side and a second side, at least one of said first side and said second side comprising a coating layer thereon comprised of polyethylene.

9. A print media product comprising:

a substrate; and at least one ink-receiving layer positioned over and above said substrate, said ink-receiving layer being comprised of at least one poly(vinyl alcohol-ethylene oxide) copolymer, at least one pigment, and at least one supplemental binder composition.

10. The print media product of claim 9 wherein said ink-receiving layer comprises not less than about 70% by weight said poly(vinyl alcohol-ethylene oxide) copolymer.

11. A print media product comprising:

a substrate; and at least one ink-receiving layer positioned over and above said substrate, said ink-receiving layer consisting essentially of at least one poly(vinyl alcohol-ethylene oxide) copolymer.

12. The print media product of claim 11 wherein said ink-receiving layer is about 100% by weight said poly(vinyl alcohol-ethylene oxide) copolymer.

13. The print media product of claim 11 wherein said print media product further comprises at least one additional material layer positioned between said substrate and said ink-receiving layer.

* * * * *